US010927196B2

(12) United States Patent
Hagadorn et al.

(10) Patent No.: US 10,927,196 B2
(45) Date of Patent: *Feb. 23, 2021

(54) LONG CHAIN BRANCHED POLYPROPYLENE VIA POLYMERIZATION WITH ALUMINUM VINYL TRANSFER AGENT

(71) Applicant: ExxonMobil Chemical Patents Inc., Baytown, TX (US)

(72) Inventors: John R. Hagadorn, Houston, TX (US); Jo Ann M. Canich, Houston, TX (US); Peijun Jiang, Katy, TX (US); Maksim E. Shivokhin, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/026,196

(22) Filed: Jul. 3, 2018

(65) Prior Publication Data
US 2018/0319907 A1    Nov. 8, 2018

Related U.S. Application Data

(63) Continuation-in-part of application No. 15/869,984, filed on Jan. 12, 2018, which is a continuation-in-part
(Continued)

(51) Int. Cl.
*C08F 4/649*        (2006.01)
*C08F 10/00*        (2006.01)
(Continued)

(52) U.S. Cl.
CPC ............. *C08F 4/6495* (2013.01); *C08F 2/38* (2013.01); *C08F 4/6498* (2013.01);
(Continued)

(58) Field of Classification Search
CPC ................ C08F 4/6498; C08F 4/64148; C08F 4/65916; C08F 2/38; C08F 110/02; C08F 110/06; C08F 110/14; C08F 10/00
See application file for complete search history.

(56) References Cited

U.S. PATENT DOCUMENTS 6,103,657 A    8/2000  Murray
6,900,321 B2   5/2005  Boussie et al.
(Continued)

FOREIGN PATENT DOCUMENTS

EP    2436703    4/2012
JP    3891905    3/2007
(Continued)

OTHER PUBLICATIONS

Nam et al., "Propene Polymerization with Stereospecific Metallocene Dichloride—[Ph3C][B(C6F5)4] Using ω-Alkenylaluminum as an Alkylation Reagent and as a Functional Comonomer," Macromolecules, 2002, vol. 35, No. 18, pp. 6760-6762.
Shiono et al., "Isospecific Polymerization of Propene over TiCl3 Combined with Bis(.omega.-alkenyl)zinc Compounds," Macromolecules, 1995, vol. 28, No. 2, pp. 437-443.
(Continued)

*Primary Examiner* — Catherine S Branch

(57) ABSTRACT

The present disclosure provides the use of quinolinyl-diamido transition metal complexes, an activator and a metal hydrocarbenyl chain transfer agent, such as an aluminum vinyl-transfer agent, to produce long chain branched propylene polymers.

41 Claims, 2 Drawing Sheets

Related U.S. Application Data of application No. 15/629,586, filed on Jun. 21, 2017, now Pat. No. 10,208,140.

(60) Provisional application No. 62/464,933, filed on Feb. 28, 2017, provisional application No. 62/357,033, filed on Jun. 30, 2016.

(51) Int. Cl.

| | |
|---|---|
| C08F 4/64 | (2006.01) |
| C08F 4/659 | (2006.01) |
| C08F 2/38 | (2006.01) |
| C08F 110/02 | (2006.01) |
| C08F 110/06 | (2006.01) |
| C08F 110/14 | (2006.01) |
| C08F 210/14 | (2006.01) |
| C08F 210/06 | (2006.01) |
| C08F 210/16 | (2006.01) |

(52) U.S. Cl.
CPC ...... *C08F 4/64148* (2013.01); *C08F 4/65916* (2013.01); *C08F 10/00* (2013.01); *C08F 110/02* (2013.01); *C08F 110/06* (2013.01); *C08F 110/14* (2013.01); C08F 4/659 (2013.01); C08F 4/65908 (2013.01); C08F 4/65912 (2013.01); C08F 210/06 (2013.01); C08F 210/14 (2013.01); C08F 210/16 (2013.01); C08F 2500/03 (2013.01)

(56) References Cited

U.S. PATENT DOCUMENTS

| | | | |
|---|---|---|---|
| 6,953,764 | B2 | 10/2005 | Frazier et al. |
| 7,858,718 | B1 | 12/2010 | Nagy et al. |
| 7,973,116 | B2 | 7/2011 | Hagadorn et al. |
| 8,158,733 | B2 | 4/2012 | Nagy et al. |
| 8,394,902 | B2 | 3/2013 | Hagadorn et al. |
| 8,592,615 | B2 | 11/2013 | Kuhlman et al. |
| 8,674,040 | B2 | 3/2014 | Hagadorn et al. |
| 8,710,163 | B2 | 4/2014 | Hagadorn et al. |
| 9,249,238 | B2 | 2/2016 | Hagadorn et al. |
| 9,260,552 | B2 | 2/2016 | Hagadorn et al. |
| 9,290,519 | B2 | 3/2016 | Hagadorn et al. |
| 9,315,593 | B2 | 4/2016 | Hagadorn |
| 9,321,858 | B2 | 4/2016 | Hagadorn et al. |
| 2012/0016092 | A1 | 1/2012 | Nagy et al. |
| 2017/0355787 | A1* | 12/2017 | Duchateau ............ C08F 210/16 |
| 2018/0002352 | A1 | 1/2018 | Jiang et al. |
| 2018/0134816 | A1 | 5/2018 | Canich et al. |
| 2018/0134827 | A1* | 5/2018 | Hagadorn ............ C08F 210/06 |

FOREIGN PATENT DOCUMENTS

| | | |
|---|---|---|
| WO | 2005/095469 | 10/2005 |
| WO | 2007/035492 | 3/2007 |
| WO | 2007/067965 | 6/2007 |
| WO | 2010/037059 | 4/2010 |
| WO | 2016/102690 | 6/2016 |
| WO | 2017/039993 | 3/2017 |

OTHER PUBLICATIONS

Weng et al., "Long Chain Branched Isotactic Polypropylene," Macromolecules, 2002, vol. 35, No. 10, pp. 3838-3843.

Dekmezian et al., "Characterization and Modeling of Metallocene-Based Branch—Block Copolymers," Macromolecules, 2002, vol. 35, No. 25, pp. 9586-9594.

Guerin et al., "Conformationally Rigid Diamide Complexes of Zirconium: Electron Deficient Analogues of Cp2Zr," Organometallics, 1996, vol. 15, No. 26, pp. 5586-5590.

Graessley et al., "Effect of molecular weight distribution on the shear dependence of viscosity in polymer systems," AIChE., 1970, vol. 16, No. 2, pp. 261-267.

Trinkle et al., "Van Gurp—Palmen Plot II—classification of long chain branched polymers by their topology," Rheol. Acta., 2002, vol. 41, No. 1-2, pp. 103-113.

Vaughan, et al., "Industrial Catalysts for Alkene Polymerization," Polymer Science: A Comprehensive Reference, vol. 3, Chapter 20, pp. 657-672.

Sentmanat et al., "Measuring the transient extensional rheology of polyethylene melts using the SER universal testing platform," Journal of Rheology, 2005. vol. 49, No. 3, pp. 585-606.

Zhang et al., "Synthesis and computation of diastereomeric phenanthroline—quinine ligands and their application in asymmetric Henry reaction," Tetrahedron, 2013, vol. 69, No. 49, 10644-10652.

Gibson,et al., "Advances in Non-Metallocene Olefin Polymerization Catalysis," Chemical Reviews, 2003, vol. 103, No. 1, pp. 283-316.

Britovsek et al., The Search for New-Generation Olefin Polymerization Catalysts: Life Beyond Metallocenes, Angew. Chem. Int. Ed., 1999, vol. 38, No. 4, pp. 428-447.

Froese et al,, "Mechanism of Activation of a Hafnium Pyridyl—Amide Olefin Polymerization Catalyst: Ligand Modification of Monomer," Journal of the American Chemical Society, 2007, vol. 129, No. 25, pp. 7831-7840.

Meissner, "Rheometer zur Untersuchung der deformationsmechanischen Eigenschaften von Kunststoff-Schmelzen unter definierter Zugbeanspruchung," Rheol. Acta., 1969, vol. 8, No. 1, pp. 78-88.

Van Gurp et al,, "Time-Temperature Superposition for Polymeric Blends," Rheol, Bull., 1998, No. 67, pp. 5-8.

Nifant'ev et al., "Reaction of 2,8-Bis(o-hydroxyaryl)quinolines with Group 4 Metal Alkyls Resulting in Three Distinct Coordination Modes of the Tridentate Ligand . X-ray Structure of Complexes and Performance as Precursors in Ethylene Polymerization Catalysis," Organometallics, 2013, vol. 32, No. 9, pp. 2685-2692.

Nifant'ev et al., "Zirconium and hafnium complexes based on 2-aryl-8-arylaminoquinoline ligands: synthesis, molecular structure, and catalytic performance in ethylene copolymerization," Dalton Transactions, 2013, vol. 42, No. 5, pp. 1501-1511.

Hu, et al., "Syntheses, Characterization, and Ethylene Polymerization of Titanium Complexes with Double-Duty Tridentate [ONN] Ligands," Organometallics, 2012, vol. 31, No. 8, pp. 3241-3247.

U.S. Appl. No. 15/906,861, filed Feb. 28, 2018 Tsou et al.
U.S. Appl. No. 15/744,478, filed Jan. 12, 2018 Holtcamp et al.
U.S. Appl. No. 15/744,475, filed Jan. 12, 2018 Holtcamp et al.
U.S. Appl. No. 15/744,513, filed Jan. 12, 2018 Hagadorn et al.
U.S. Appl. No. 15/869,941, filed Jan. 12, 2018 Canich et al.

Nicheti et al., "Viscosity model for polydisperse polymer melts," Jouranl of Rheology, 1998, vol. 42, No. 4, pp. 951-969.

\* cited by examiner

LONG CHAIN BRANCHED POLYPROPYLENE VIA POLYMERIZATION WITH ALUMINUM VINYL TRANSFER AGENT

CROSS REFERENCE TO RELATED APPLICATIONS

This application is a continuation-in-part of U.S. Ser. No. 15/869,984, filed Jan. 12, 2018, which claims priority to and benefit of USSN 62/464,933 filed Feb. 28, 2017, and is a continuation-in-part of U.S. Ser. No. 15/629,586, filed Jun. 21, 2017, which claims priority to and benefit of 62/357,033 filed Jun. 30 2016.

FIELD OF THE INVENTION

The present disclosure relates to the use of quinolinyl-diamido transition metal complexes and catalyst systems with an activator and a metal hydrocarbenyl chain transfer agent, such as an aluminum vinyl-transfer agent (AVTA), to produce long chain branched polypropylene.

BACKGROUND OF THE INVENTION

Polypropylene with high melt strength is useful for the production of polypropylene foams and blown films. Polypropylene resins produced using conventional processes and catalyst systems are typically highly linear with insufficient melt strength for, inter alia, polypropylene foams and blown films. Linear polypropylene can be crosslinked using peroxides, but this process is expensive and leads to polymer degradation or highly crosslinked polymers that are too stiff and, accordingly, lack processability.

U.S. Pat. Nos. 9,315,593; 9,260,552; and 2014/256,893 describe the production of polyolefins using pyridyldiamido catalysts in the presence of chain-transfer agents that do not feature transferrable vinyl groups.

Macromolecules 2002, 35, 6760-6762 discloses propene polymerization with tetrakis(pentafluorophenyl)borate, 7-octenyldiisobutylaluminum, and racMe$_2$Si (2-Me-indenyl)$_2$ZrCl$_2$ or Ph$_2$C(cyclopentadienyl)(fluorenyl) ZrCl$_2$ to produce polypropylene with octenyldiisobutylaluminum incorporated as a comonomer.

JP 2004-83773-A describes the preparation of polypropylene in the presence of trialkenylaluminum using metallocene and Ziegler-Natta catalysts.

Macromolecules 1995, 28, 437-443 describes the formation of isotactic polypropylene containing vinyl end groups by the Ziegler-Natta catalyzed polymerization of propylene in the presence of dialkenylzincs.

Macromolecules 2002, 35, 3838-3843 describes the formation of long-chain branched polypropylene via the insertion of in situ formed vinyl-terminated polypropylene into growing polymer chains.

Macromolecules 2002, 35, 9586-9594 describes the formation of long-chain branched copolymers of ethylene and alpha olefins via the insertion of in situ formed vinyl-terminated polymer into growing polymer chains.

EP 2436703 A1 describes the production of comb architecture branch block copolymers in a process that uses dual catalysts and a zinc-based polymerizable chain shuttling agent.

WO 2007/035492 describes the production of long-chain branched and branch block copolymers by polymerization of alkene monomers in the presence of a zinc-based polymerizable shuttling agent.

WO 2016/102690 discloses a process for preparation of a branched polyolefin using a metal hydrocarbyl transfer agent.

US 2018/134827, a parent to this disclosure, discloses the use of pyridyldiamido and/or quinolinyldiamido transition metal complexes and catalyst systems with an activator and a metal hydrocarbenyl chain transfer agent, such as an aluminum vinyl-transfer agent (AVTA), to produce branched propylene polymers, preferably propylene-ethylene copolymers or propylene-ethylene-diene monomer copolymers.

There is a need for new and improved processes for the polymerization of olefins, in order to achieve polymer properties, such as long chain branching, high melting point, high molecular weights, increased conversion, increased comonomer incorporation, and/or altered comonomer distribution.

SUMMARY OF THE INVENTION

The present disclosure relates to processes to produce branched propylene polymers comprising contacting monomer including propylene with a catalyst system comprising an activator, a metal hydrocarbenyl chain transfer agent, and a catalyst compound represented by Formula (I):

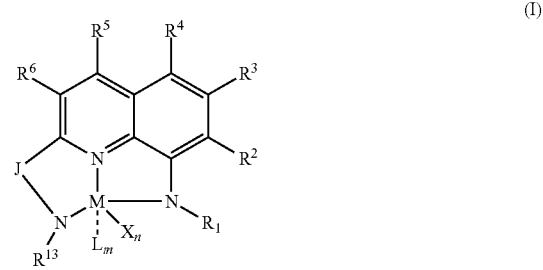

wherein:
M is a group 3, 4, or 5 metal;
J is a three-atom-length bridge between the quinoline and the amido nitrogen;
X is an anionic leaving group;
L is a neutral Lewis base;
$R^1$ and $R^{13}$ are independently selected from the group consisting of hydrocarbyls, substituted hydrocarbyls, and silyl groups;
$R^2$, $R^3$, $R^4$, $R^5$, and $R^6$ are independently selected from the group consisting of hydrogen, hydrocarbyls, alkoxy, silyl, amino, aryloxy, substituted hydrocarbyls, halogen, and phosphino;
n is 1 or 2;
m is 0, 1, or 2
n+m is not greater than 4; and
any two adjacent R groups (e.g., $R^1$ & $R^2$, $R^2$ & $R^3$, etc.) may be joined to form a substituted hydrocarbyl, unsubstituted hydrocarbyl, substituted heterocyclic ring, or unsubstituted heterocyclic ring, where the ring has 5, 6, 7, or 8 ring atoms and where substitutions on the ring can join to form additional rings;
any two X groups may be joined together to form a dianionic group;
any two L groups may be joined together to form a bidentate Lewis base; and
an X group may be joined to an L group to form a monoanionic bidentate group.

The present disclosure further relates to catalyst systems comprising activator, transition metal catalyst complex represented by the Formula (I) above, and aluminum vinyl transfer agent represented by formula:

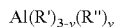

wherein each R' independently is a $C_1$-$C_{30}$ hydrocarbyl group; each R", independently, is a $C_4$-$C_{20}$ hydrocarbenyl group having an end-vinyl group; and v is from 0.1 to 3;

The present disclosure further relates to novel branched propylene polymers. A propylene long-chain branched polymer which can be suitable for applications like foaming, thermoforming, blow molding, film casting or the like, because of having good flow characteristics and high melt strength. A branched propylene polymer can include from about 90 wt % or greater propylene, wherein said branched propylene polymers: a) has a $g'_{vis}$ of 0.97 or less; b) has strain hardening ratio of 1 or greater; c) has an Mw of 50,000 g/mol or more; and d) has a Mw/Mn of 4 or less.

DETAILED DESCRIPTION

Figure 1:
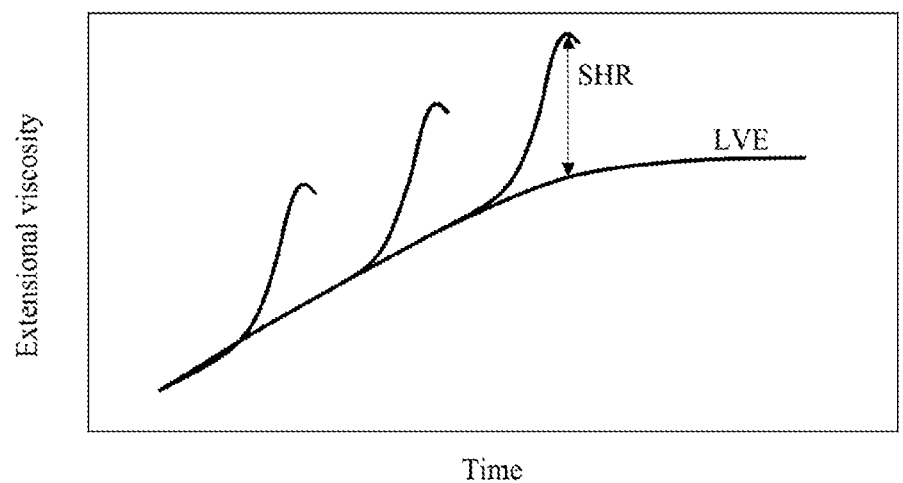
FIG. 1 is a graph illustrating strain hardening ratio in the curve of extensional viscosity as a function of time, according to one embodiment.
Figure 2:
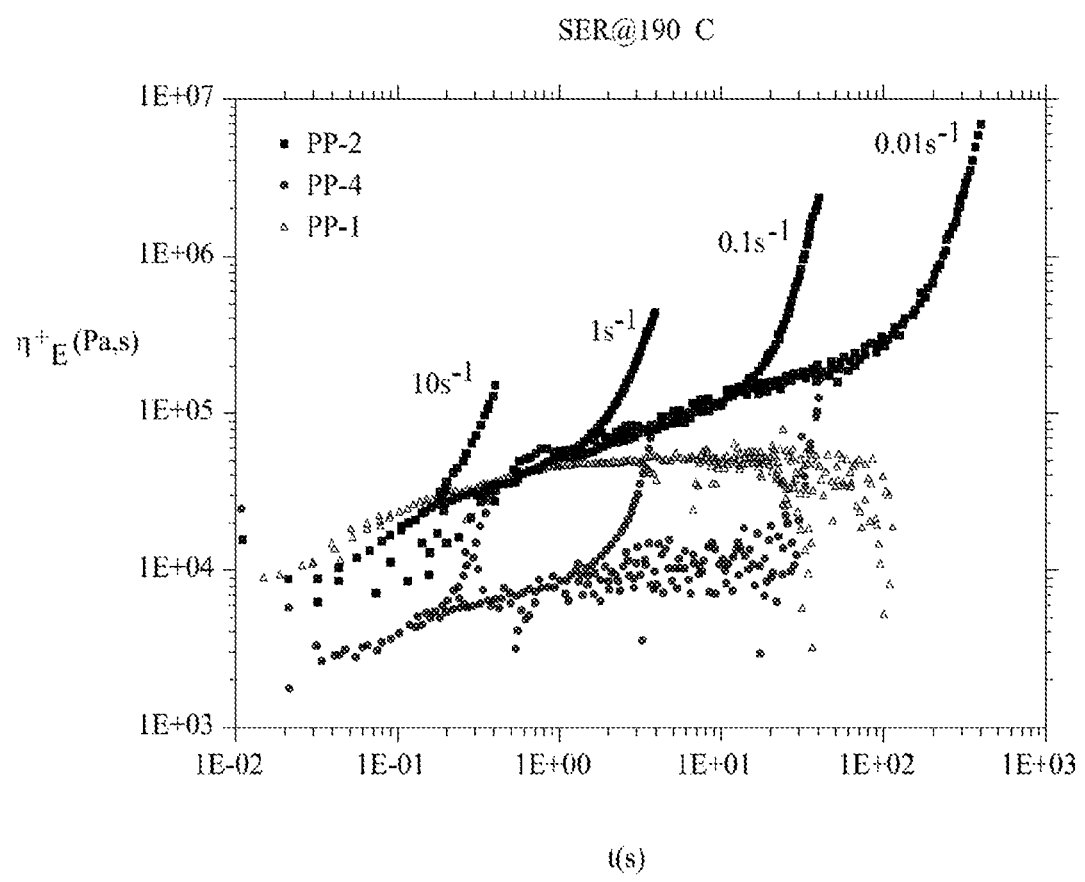
FIG. 2 is a graph illustrating extensional viscosity of linear and branched homopolypropylenes, according to one embodiment.

The present disclosure is directed to polymerization processes to produce-olefin polymers such polypropylene polymers using transition metal complexes and catalyst systems that include the transition metal complexes. In at least one embodiment, polyolefin polymers can be branched propylene polymers produced by contacting propylene, optional monomer with a catalyst system including at least one activator, at least one metal hydrocarbenyl chain transfer agent, and at least one catalyst compound. In another class of embodiments, the present disclosure relates to branched propylene polymer compositions, having unique properties and rheology performance.

In at least one embodiment, processes and catalysts of the present disclosure provide catalyst efficiency greater than 50,000 g polymer/g catalyst, and polyolefins, such as propylene polymer, having from about 90 wt % or greater propylene, a $g'_{vis}$ value of 0.97 or less, an Mn of 10,000 g/mol or greater, an Mw of 50,000 g/mol or greater, and an Mw/Mn of 4 or less.

For the purposes of the present disclosure, the numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Hf, Ti, or Zr.

"Catalyst productivity" is a measure of how many grams of polymer (P) are produced using a polymerization catalyst including W g of catalyst (cat), over a period of time of T hours; and may be expressed by the following formula: P/(T×W) and expressed in units of gPgcat$^{-1}$hr$^{-1}$. Conversion is the amount of monomer that is converted to polymer product, and is reported as mol % and is calculated based on the polymer yield and the amount of monomer fed into the reactor. "Catalyst efficiency" is a measure of the mass of product polymer (P) produced per mass of catalyst (cat) used (gP/gcat). The mass of the catalyst is the weight of the pre-catalyst without including the weight of the activator.

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on. For the purposes of the present disclosure, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Unless otherwise noted all melting points (Tm) are DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as the is tetrahydrofuran, RT is room temperature (and is 23° C. unless otherwise indicated), tol is toluene, EtOAc is ethyl acetate, Cy is cyclohexyl, AVTA is aluminum vinyl transfer agent, Cp is cyclopentadienyl, Cp* is pentamethyl cydopentadienyl, and Ind is indenyl, etc.

A "catalyst system" includes at least one catalyst compound and at least one activator. When "catalyst system" is used to describe such the catalyst compound/activator combination before activation, it means the unactivated catalyst complex (precatalyst) together with an activator and, optionally, a co-activator. When it is used to describe the combination after activation, it means the activated complex and the activator or other charge-balancing moiety. The transition metal compound may be neutral as in a precatalyst, or a charged species with a counter ion as in an activated catalyst system. For the purposes of the present disclosure, when catalyst systems are described as including neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst precursor, a pre-catalyst compound, catalyst compound or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Except with respect to the term "substituted hydrocarbyl," the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring. As examples, methyl cyclopentadiene (Cp) is a Cp group substituted with a methyl group, and ethyl alcohol is an ethyl group substituted with an —OH group. The term "substituted hydrocarbyl" means hydrocarbyl radicals in which at least one hydrogen atom of the hydrocarbyl radical has been substituted with a heteroatom or heteroatom-containing group, such as halogen (e.g., Br, Cl, F or I), or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

The terms "hydrocarbyl radical," "hydrocarbyl," "hydrocarbyl group," are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical where the term alkyl is as defined above. For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may include at least one aromatic group. Examples of suitable alkyl ether radicals can include methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example, a continuous process to produce a polymer would be one where the reactants are continually introduced into one or more reactors and polymer product is continually withdrawn until the polymerization is stopped.

The present disclosure relates to catalyst systems including a quinolinyldiamide transition metal complex represented by formula (I) or (II) described herein, an activator (such as an alumoxane or a non-coordinating anion), and metal hydrocarbenyl transfer agent represented by the formula: $Al(R')_{3-v}(R'')_v$, where each R', independently, is a $C_1$ to $C_{30}$ hydrocarbyl group; each R", independently, is a $C_4$ to $C_{20}$ hydrocarbenyl group having an allyl chain end; v is from 0.1 to 3 (such as 1 or 2). For example, the metal hydrocarbenyl transfer agent is an aluminum vinyl-transfer agent (AVTA) represented by the formula (A):

$$Al(R')_{3-v}(R'')_v$$

where R" is a hydrocarbenyl group containing 4 to 20 carbon atoms having an allyl chain end, R' is a hydrocarbyl group containing 1 to 30 carbon atoms, and v is 0.1 to 3, alternately 1 to 3, alternately 1.1 to less than 3, alternately v is 0.5 to 2.9, 1.1 to 2.9, alternately 1.5 to 2.7, alternately 1.5 to 2.5, alternately 1.8 to 2.2. The compounds represented by the formula $Al(R')_{3-v}(R'')_v$ can be a neutral species, but anionic formulations may be envisioned, such as those represented by formula (B): $[Al(R')_{4-w}(R'')_w]$, where w is 0.1 to 4, R" is a hydrocarbenyl group containing 4 to 20 carbon atoms having an allyl chain end, and R' is a hydrocarbyl group containing 1 to 30 carbon atoms.

In at least one embodiment of any formula for a metal hydrocarbenyl transfer agent, such as formula A or B, described herein, each R' is independently chosen from $C_1$ to $C_{30}$ hydrocarbyl groups (such as a $C_1$ to $C_{20}$ alkyl groups, such as methyl, ethyl, propyl, butyl, pentyl, hexyl, heptyl, octyl, nonyl, decyl, undecyl, dodecenyl, or an isomer thereof), and R" is represented by the formula:

$$-(CH_2)_n CH=CH_2$$

where n is an integer from 2 to 18, such as 6 to 18, such as 6 to 12, such as 6 to 8, such as 6, or such as 8.

The catalyst/activator combinations are formed by combining the transition metal complex with activators, including by supporting them for use in slurry or gas phase polymerization. The catalyst/activator combinations may also be added to or generated in solution polymerization or bulk polymerization (in the monomer). The metal hydrocarbenyl transfer agent (such as an aluminum vinyl transfer agent) may be added to the catalyst and or activator before, during or after the activation of the catalyst complex or before or during polymerization. The metal hydrocarbenyl transfer agent (such as aluminum vinyl-transfer agent) is added to the polymerization reaction separately, such as before, the catalyst/activator pair.

In at least one embodiment, the polymer produced from the polymerization using the catalyst systems described herein contains at least one vinyl chain end. In at least one embodiment, polymers produced from the polymerization can be propylene polymers and copolymers products. If the catalyst complex chosen is also capable of incorporating bulky alkene monomers, such as $C_6$ to $C_{20}$ alpha olefins, into the growing polymer chain, then the resulting polymer (such as an propylene copolymer) may contain long chain branches formed by the insertion of a vinyl terminated polymer chain formed in situ (also referred to as a "vinyl-terminated macromonomer") into the growing polymer chains. Process conditions including residence time, the ratio of monomer to polymer in the reactor, and the ratio of transfer agent to polymer will affect the amount of long chain branching in the polymer, the average length of branches, and the type of branching observed. A variety of branching types may be formed, which include comb architectures and branch on branch structures similar to those found in low-density polyethylene. The combination of chain growth and vinyl-group insertion may lead to polymer with a branched structure and having one or fewer vinyl unsaturations per polymer molecule. The absence of significant quantities of individual polymer molecules containing greater than one vinyl unsaturation prevents or reduces the formation of unwanted crosslinked polymers. For example, polymers having long chain branching can have a branching index ($g'_{vis}$) of 0.97 or less, alternately 0.95 or less, alternately 0.90 or less, alternately 0.85 or less, alternately 0.80 or less, alternately 0.75 or less, alternately 0.70 or less, alternately 0.60 or less.

If the catalyst chosen is poor at incorporating comonomers such as $C_4$ to $C_{20}$ alpha olefins, then the polymer obtained is largely linear (little or no long chain branching). Likewise, process conditions including the ratio of transfer agent to polymer will affect the molecular weight of the polymer. For example, polymers having little or no long chain branching can have a $g'_{vis}$ of, more than 0.97, preferably 0.98 or more.

Alkene polymerizations and co-polymerizations using one or more transfer agents, such as an AVTA, with two or more catalysts are also of potential use. Desirable products that may be accessed with this approach includes polymers that have branch block structures and/or high levels of long-chain branching.

The transfer agent to catalyst complex equivalence ratio can be from about 1:100 to 500,000:1. For example, the molar ratio of transfer agent to catalyst complex can be greater than one. Alternately, the molar ratio of transfer agent to catalyst complex can be greater than 30. The AVTA to catalyst complex equivalence ratio can be from about 1:100 to 500,000:1. For example, the molar ratio of AVTA to catalyst complex can be greater than one, such as the molar ratio of AVTA to catalyst complex is greater than 30.

The AVTA can also be used in combination with other chain transfer agents such as scavengers, such as trialkyl aluminum compounds (where the alkyl groups are selected from $C_1$ to $C_{20}$ alkyl groups, such as methyl, ethyl, propyl, butyl, pentyl, hexyl, heptyl, octyl, nonyl, decyl, undecyl, dodecyl, or an isomer thereof). In at least one embodiment, the AVTA can be used in combination with a trialkyl aluminum compound such as TNOAL and TIBAL.

The transfer agent can also be used in combination with oxygen-containing organoaluminums such as bis(diisobutylaluminum)oxide, MAO, MMAO-3A, and other alumoxanes. Certain of these oxygen-containing organoaluminums are expected to serve as scavengers while remaining significantly less prone to hydrocarbyl group chain-transfer than common organoaluminums, such as trimethylaluminum or TNOAL.

The production of di-end-functionalized polymers is possible with this technology. One product, prior to exposure to air, from an alkene polymerization performed in the presence of AVTA is the aluminum-capped species $Al(R')_{3-v}$ (polymer-$CH=CH_2$)$_v$, where v is 0.1 to 3 (alternately 1 to 3, alternately 1, 2, or 3). The Al-carbon bonds will react with a variety of electrophiles (and other reagents), such as oxygen, halogens, carbon dioxide, and the like. Thus, quenching the reactive polymer mixture with an electrophile prior to exposure to atmosphere would yield a di-end-functionalized product of the general formula: Z-(monomers)$_n$-$CH=CH_2$, where Z is a group from the reaction with the electrophile and n is an integer, such as from 1 to 1,000,000, alternately from 2 to 50,000, alternately from 10 to 25,000. For example, quenching with oxygen yields a polymer functionalized at one end with a hydroxy group and at the other end with a vinyl group. Quenching with bromine yields a polymer functionalized at one end with a Br group and at the other end with a vinyl group.

Suitable metal hydrocarbenyl transfer agents (such as aluminum vinyl transfer agents) can be present at from 10 or 20 or 50 or 100 equivalents to 600 or 700 or 800 or 1000 equivalents relative to the catalyst complex. Alternately, the metal hydrocarbenyl transfer agents can be present at a catalyst complex-to-transfer agent molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

In at least one embodiment of the present disclosure, the aluminum vinyl transfer agent can be present at a catalyst complex-to-aluminum vinyl transfer agent molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1, alternately from 1:1000 or more.

Transition Metal Complexes

Transition metal complexes for polymerization processes can include any olefin polymerization catalyst that readily undergoes reversible polymeryl group chain transfer with the added aluminum vinyl transfer agent (AVTA) and is also capable of incorporating the vinyl group of the AVTA to form a long-chain branched polymer. Suitable catalyst components may include "non-metallocene complexes" that are defined to be transition metal complexes that do not feature a cyclopentadienyl anion or substituted cyclopentadienyl anion donors (e.g., cyclopentadienyl, fluorenyl, indenyl, such as methylcyclopentadienyl). Examples of families of non-metallocene complexes that may be suitable can include late transition metal pyridylbisimines (e.g., U.S. Pat. No. 7,087,686), group 4 pyridyldiamidos (e.g., U.S. Pat. No. 7,973,116), quinolinyldiamidos (e.g., US 2018/0002352 A1), pyridylamidos (e.g., U.S. Pat. No. 7,087,690), phenoxyimines (e.g., Accounts of Chemical Research 2009, 42, 1532-1544), and bridged bi-aromatic complexes (e.g., U.S. Pat. No. 7,091,292).

Non-metallocene complexes can include iron complexes of tridentate pyridylbisimine ligands, zirconium and hafnium complexes of pyridylamido ligands, zirconium and hafnium complexes of tridentate pyridyldiamido ligands, zirconium and hafnium complexes of tridentate quinolinyldiamido ligands, zirconium and hafnium complexes of bidentate phenoxyimine ligands, and zirconium and hafnium complexes of bridged bi-aromatic ligands.

Suitable non-metallocene complexes can include zirconium and hafnium non-metallocene complexes. In at least one embodiment, non-metallocene complexes for the present disclosure include group 4 non-metallocene complexes including two anionic donor atoms and one or two neutral donor atoms. Suitable non-metallocene complexes for the present disclosure include group 4 non-metallocene complexes including an anionic amido donor. Suitable non-metallocene complexes for the present disclosure include group 4 non-metallocene complexes including an anionic aryloxide donor atom. Suitable non-metallocene complexes for the present disclosure include group 4 non-metallocene complexes including two anionic aryloxide donor atoms and two additional neutral donor atoms.

Transition metal complexes suitable for these polymerization processes can include quinolinyldiamido transition metal complexes where a three-atom linker is used between the quinoline and the nitrogen donor in the 2-position of the quinoline ring. This has been found to be an important aspect because the use of the three-atom linker is believed to yield a metal complex with a seven-membered chelate ring that is not coplanar with the other five-membered chelate ring. The resulting complex is thought to be effectively chiral (Ci symmetry), even when there are no permanent stereocenters present. This is a desirable catalyst feature, for example, for the production of isotactic polyolefins.

Transition metal complexes useful herein include quinolinyldiamido transition metal complexes represented by Formula (I), such as by Formula (II):

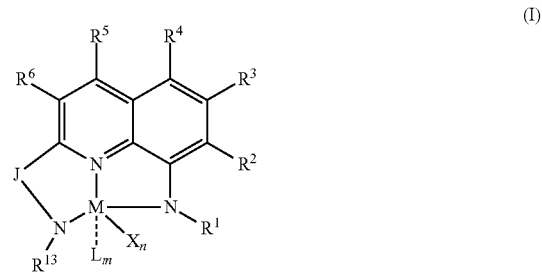

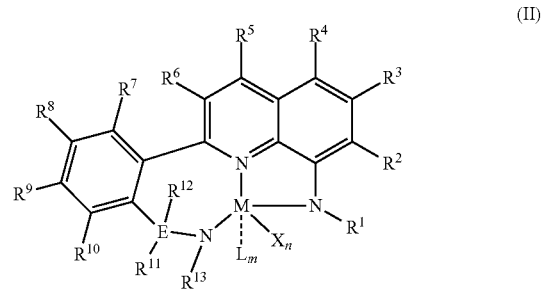

wherein:

M is a Group 3, 4, 5, 6, 7, 8, 9, 10, 11, or 12 metal (such as a group 4 metal);

J is group including a three-atom-length bridge between the quinoline and the amido nitrogen, such as a group containing up to 50 non-hydrogen atoms;

E is carbon, silicon, or germanium;

X is an anionic leaving group, (such as a hydrocarbyl group or a halogen);

L is a neutral Lewis base;

$R^1$ and $R^{13}$ are independently selected from the group consisting of hydrocarbyls, substituted hydrocarbyls, and silyl groups;

$R^2$, $R^3$, $R^4$, $R^5$, and $R^6$ are independently selected from the group consisting of hydrogen, hydrocarbyls, alkoxy, silyl, amino, aryloxy, substituted hydrocarbyls, halogen, and phosphino;

$R^7$, $R^8$, $R^9$, $R^{10}$, and $R^{12}$ are independently selected from hydrogen, hydrocarbyls, alkoxy, silyl, amino, aryloxy, substituted hydrocarbyls, halogen, or any two adjacent R groups are joined to form a substituted or unsubstituted hydrocarbyl or heterocyclic ring, where the ring has 5, 6, 7, or 8 ring atoms and where substitutions on the ring can join to form additional rings;

n is 1 or 2;

m is 0, 1, or 2, where n+m is not greater than 4; and any two adjacent R groups (e.g., $R^1$ and $R^2$, $R^2$ and $R^3$, etc.) may be joined to form a substituted hydrocarbyl, unsubstituted hydrocarbyl, substituted heterocyclic ring, or unsubstituted heterocyclic ring, where the ring has 5, 6, 7, or 8 ring atoms and where substitutions on the ring can join to form additional rings;

any two X groups may be joined together to form a dianionic group;

any two L groups may be joined together to form a bidentate Lewis base; and any X group may be joined to an L group to form a monoanionic bidentate group.

In at least one embodiment, M is a group 4 metal, such as titanium, zirconium or hafnium.

In at least one embodiment, J is an aromatic substituted or unsubstituted hydrocarbyl (such as a hydrocarbyl) having from 3 to 30 non-hydrogen atoms, such as J is represented by the formula:

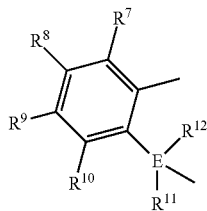

where $R^7$, $R^8$, $R^9$, $R^{10}$, $R^{11}$, $R^{12}$ are as defined above, E is carbon, silicon, or germanium;

and any two adjacent R groups (e.g., $R^7$ and $R^8$, $R^8$ and $R^9$, $R^9$ and $R^{10}$, $R^{10}$ and $R^{11}$, etc.) may be joined to form a substituted or unsubstituted hydrocarbyl or heterocyclic ring, where the ring has 5, 6, 7, or 8 ring atoms (such as 5 or 6 atoms), and said ring may be saturated or unsaturated (such as partially unsaturated or aromatic), such as J is an arylalkyl (such as arylmethyl, etc.) or dihydro-1H-indenyl, or tetrahydronaphthalenyl group.

In at least one embodiment of the present disclosure, J is selected from the following structures:

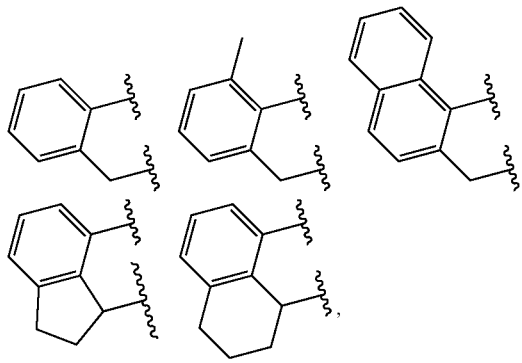

where ⸹ indicates connection to the catalyst compound.

In at least one embodiment of the present disclosure, $R^{11}$ and $R^{12}$ are independently selected from hydrogen, methyl, ethyl, phenyl, isopropyl, isobutyl, and trimethylsilyl.

In at least one embodiment of the present disclosure, E is carbon.

In at least one embodiment of the present disclosure, $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, and trimethylsilyl.

In at least one embodiment of the present disclosure, $R^2$, $R^3$, $R^4$, $R^5$, and $R^6$ are independently selected from hydrogen, hydrocarbyls, alkoxy, silyl, amino, substituted hydrocarbyls, and halogen.

In at least one embodiment of the present disclosure, each L is independently selected from Et2O, MeOtBu, Et3N, PhNMe2, MePh2N, tetrahydrofuran, and dimethylsulfide and each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

In at least one embodiment of the present disclosure, $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl; and/or $R^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

In at least one embodiment of the present disclosure, J is dihydro-1H-indenyl and $R^1$ is 2,6-dialkylphenyl or 2,4,6-trialkylphenyl.

In at least one embodiment of the present disclosure, $R^1$ is 2,6-diisopropylphenyl and $R^{13}$ is a hydrocarbyl group containing 1, 2, 3, 4, 5, 6, or 7 carbon atoms.

In at least one embodiment of the present disclosure, $R^{10}$ and $R^{11}$ are joined to form a six-membered ring with the joined $R^{10}R^{11}$ group being —$CH_2CH_2CH_2$—.

In at least one embodiment of the present disclosure, $R^1$ and $R^{13}$ may be independently selected from phenyl groups that are variously substituted with between zero to five substituents that include F, Cl, Br, I, CF3, NO2, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment of the present disclosure, the quinolinyldiamido transition metal complex represented by the Formula (II) above where:

M is a group 4 metal (such as hafnium);

E is selected from carbon, silicon, or germanium (such as carbon);

X is an alkyl, aryl, hydride, alkylsilane, fluoride, chloride, bromide, iodide, triflate, carboxylate, amido, alkoxo, or alkylsulfonate;

L is an ether, amine, or thioether;

$R^1$ and $R^{13}$ are independently selected from the group consisting of hydrocarbyls, substituted hydrocarbyls, and silyl groups (such as aryl);

$R^2$, $R^3$, $R^4$, $R^5$, $R^6$, $R^7$, $R^8$, $R^9$, $R^{10}$, $R^{11}$, and $R^{12}$ are independently hydrogen, hydrocarbyl, alkoxy, silyl, amino, aryloxy, substituted hydrocarbyls, halogen, and phosphino;

n is 1 or 2;

m is 0, 1, or 2;

n+m is from 1 to 4; and two X groups may be joined together to form a dianionic group;

two L groups may be joined together to form a bidentate Lewis base;

an X group may be joined to an L group to form a monoanionic bidentate group;

$R^7$ and $R^8$ may be joined to form a ring (such as an aromatic ring, a six-membered aromatic ring with the joined $R^7R^8$ group being —CH=CHCH=CH—);

$R_{10}$ and $R_{11}$ may be joined to form a ring (such as a five-membered ring with the joined $R_{10}R_{11}$ group being —$CH_2CH_2$—, a six-membered ring with the joined $R_{10}R_{11}$ group being —$CH_2CH_2CH_2$—).

In at least one embodiment of Formula (I) and (II), $R^4$, $R^5$, and $R^6$ are independently selected from the group consisting of hydrogen, hydrocarbyls, substituted hydrocarbyls, alkoxy, aryloxy, halogen, amino, and silyl, and where adjacent R groups ($R^4$ and $R^5$, and/or $R^5$ and $R^6$) may be joined to form a substituted hydrocarbyl, unsubstituted hydrocarbyl, unsubstituted heterocyclic ring or substituted heterocyclic ring, where the ring has 5, 6, 7, or 8 ring atoms and where substitutions on the ring can join to form additional rings.

In at least one embodiment, of Formula (I) and (II), $R^7$, $R^8$, $R^9$, and $R^{10}$ are independently selected from the group consisting of hydrogen, hydrocarbyls, substituted hydrocarbyls, alkoxy, halogen, amino, and silyl, and where adjacent R groups ($R^7$ and $R^8$, and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

In at least one embodiment of Formula (I) or (II), $R^2$ and $R^3$ are each, independently, selected from the group consisting of hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In at least one embodiment of Formula (I) or (II), $R^{11}$ and $R^{12}$ are each, independently, selected from the group consisting of hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings.

In at least one embodiment of Formula (I) or (II), $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment of Formula (II), suitable $R^{12}$-E-$R^{11}$ groups include $CH_2$, $C(CH_3)_2$, $Si(CH_3)_2$, $SiEt_2$, $SiPr_2$, $SiBu_2$, $SiPh_2$, $Si(aryl)_2$, $Si(alkyl)_2$, $CH(aryl)$, $CH(Ph)$, $CH(alkyl)$, and $CH(2\text{-isopropylphenyl})$, where alkyl is a $C_1$ to $C_{40}$ alkyl group (such as $C_1$ to $C_{20}$ alkyl, such as one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (such as a $C_6$ to $C_{20}$ aryl group, such as phenyl or substituted phenyl, such as phenyl, 2-isopropylphenyl, or 2-tertbutylphenyl).

For example, the R groups above and other R groups mentioned hereafter, contain from 1 to 30, such as 2 to 20 carbon atoms, especially from 6 to 20 carbon atoms.

In at least one embodiment of the present disclosure, E is carbon and $R^{12}$ and $R^{11}$ are independently selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyl groups with from one to ten carbons.

In at least one embodiment of Formula (II), $R^{11}$ and $R^{12}$ are independently selected from hydrogen, methyl, ethyl, phenyl, isopropyl, isobutyl, and trimethylsilyl.

In at least one embodiment of the present disclosure of Formula (II), $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, and trimethylsilyl.

In at least one embodiment of Formula (I) or (II), $R^2$, $R^3$, $R^4$, $R^5$, and $R^6$ are independently selected from the group consisting of hydrogen, hydrocarbyls, alkoxy, silyl, amino, substituted hydrocarbyls, and halogen.

In at least one embodiment of Formula (I) or (II), each L is independently selected from $Et_2O$, MeOtBu, $Et_3N$, $PhNMe_2$, $MePh_2N$, tetrahydrofuran, and dimethylsulfide.

In at least one embodiment of Formula (I) or (II), each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

In at least one embodiment of Formula (I) or (II), $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl.

In at least one embodiment of Formula (I) or (II), $R^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

In at least one embodiment described herein of Formula (II), where J is dihydro-1H-indenyl and $R^1$ is 2,6-dialkylphenyl or 2,4,6-trialkylphenyl.

In at least one embodiment of Formula (I) or (II), $R^1$ is 2,6-diisopropylphenyl and $R^{13}$ is a hydrocarbyl group containing 1, 2, 3, 4, 5, 6, or 7 carbon atoms.

Further description of quinolinyldiamido transition metal complexes and their preparation is found at US 2018/0002352, which is incorporated by reference herein.

Ligand Synthesis

The quinolinyldiamine ligands described herein are generally prepared in multiple steps. The main step in the synthesis of the quinolinyldiamine ligand is the carbon-carbon bond coupling step shown below in Scheme 1, where fragment 1 and fragment 2 are joined together in a transition metal mediated reaction. In the specific examples described herein the coupling step involves the use of $Pd(PPh_3)_4$, but other transition metal catalysts (e.g., Ni or Cu containing complexes) are also useful for this type of coupling reaction. In the specific examples, the W* and Y* groups used were a boronic acid ester and a halide, respectively. This choice was suitable for the Pd-mediated coupling step, but other groups may also be useful for the coupling reaction. Other possible W* and Y* groups of interest include alkali metal (e.g., Li), alkaline earth metal halide (e.g., MgBr), zinc halide (e.g., ZnCl), zincate, halide, and triflate. In Scheme 1, $R^1$ through $R^{13}$ and E are as described above.

Scheme 1

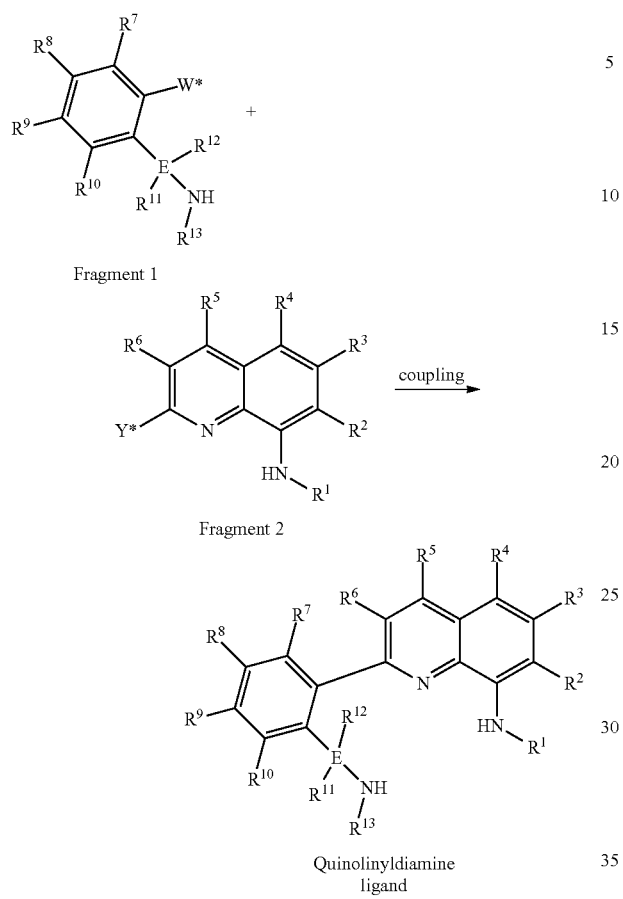

Fragment 1

Fragment 2

Quinolinyldiamine ligand

Scheme 2

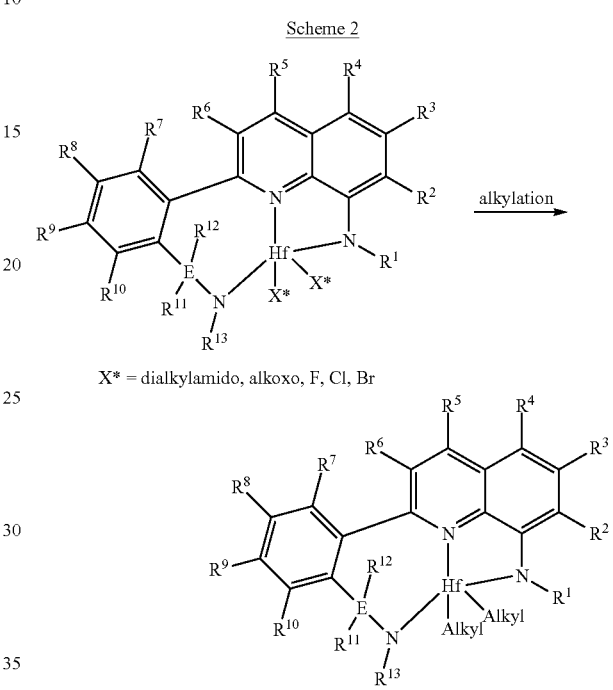

X* = dialkylamido, alkoxo, F, Cl, Br

One method for the preparation of transition metal quinolinyldiamide complexes is by reaction of the quinolinyldiamine ligand with a metal reactant containing anionic basic leaving groups. Suitable anionic basic leaving groups include dialkylamido, benzyl, phenyl, hydrido, and methyl. In this reaction, the role of the basic leaving group is to deprotonate the quinolinyldiamine ligand. Suitable metal reactants for this type of reaction include, but are not limited to, $HfBn_4$ ($Bn=CH_2Ph$), $ZrBn_4$, $TiBn_4$, $ZrBn_2Cl_2(OEt_2)$, $HfBn_2Cl_2(OEt_2)_2$, $Zr(NMe_2)_2Cl_2$(dimethoxyethane), $Hf(NMe_2)_2Cl_2$(dimethoxyethane), $Hf(NMe_2)_4$, $Zr(NMe_2)_4$, and $Hf(NEt_2)_4$. In the specific examples of the present disclosure, $Hf(NMe_2)_4$ is reacted with a quinolinyldiamine ligand at elevated temperatures to form the quinolinyldiamide complex with the formation of two molar equivalents of dimethylamine, which is lost or removed before the quinolinyldiamide complex is isolated.

A second method for the preparation of transition metal quinolinyldiamide complexes is by reaction of the quinolinyldiamine ligand with an alkali metal or alkaline earth metal base (e.g., BuLi, EtMgBr) to deprotonate the ligand, followed by reaction with a metal halide (e.g., $HfCl_4$, $ZrCl_4$).

Quinolinyldiamide (QDA) metal complexes that contain metal-halide, alkoxide, or amido leaving groups may be alkylated by reaction with organolithium, Grignard, and organoaluminum reagents as shown in Scheme 2. In the alkylation reaction the alkyl groups are transferred to the QDA metal center and the leaving groups are removed. In Scheme 2, $R^1$ through $R^{13}$ and E are as described above and X* is a halide, alkoxide, or dialkylamido leaving group. Suitable reagents for the alkylation reaction include, but are not limited to, MeLi, MeMgBr, $Me_2Mg$, $AlMe_3$, $AliBu_3$, $AlOct_3$, and $PhCH_2MgCl$. For example, 2 to 20 molar equivalents of the alkylating reagent are added to the QDA complex. The alkylations are generally performed in ethereal or hydrocarbon solvents or solvent mixtures at temperatures ranging from −80° C. to 70° C.

In at least one embodiment of the present disclosure, the transition metal complex is not a metallocene. A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes described above have been synthesized, catalyst systems may be formed by combining them with activators in any suitable manner including by supporting them for use in slurry or gas phase polymerization. The catalyst systems may also be added to or generated in solution polymerization or bulk polymerization (in the monomer). Suitable catalyst system includes a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Activators can include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In at least one embodiment, alumoxane activators are utilized as an activator in the catalyst system. Alumoxanes are generally oligomeric compounds containing —Al($R^1$)—O-sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. Suitable visually clear methylalumoxane may also be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylaluminoxane type 3A, covered under U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), some embodiments select the maximum amount of suitable activator at up to a 5000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane is present at zero mole %, alternately the alumoxane is present at a molar ratio of aluminum to catalyst compound transition metal less than 500:1, such as less than 300:1, such as less than 100:1, such as less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes. Further, the anion might not transfer an anionic substituent or fragment to the cation so as to cause it to form a neutral transition metal compound and a neutral by-product from the anion. Non-coordinating anions can be those that are compatible, stabilize the transition metal cation in the sense of balancing its ionic charge at +1, and yet retain sufficient lability to permit displacement during polymerization.

It is within the scope of the present disclosure to use a neutral or ionic activator, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator. In at least one embodiment, boron containing NCA activators represented by the formula below can be used: where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums. $Z_d^+$ can be triphenyl carbonium. Reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: ($Ph_3C$), where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation (L-H)$_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula [$M^{k+}Q_n$]$^{d-}$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic stoichiometric activator $Z_d^+$ ($A^{d-}$) can be one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate, methyldioctadecylammonium tetrakis(pentafluorophenyl)borate, or methyl-bis(hydrogenated tallow)ammonium tetrakis(pentafluorophenyl)borate.

Bulky activators are also useful herein as NCAs. "Bulky activator" as used herein refers to anionic activators represented by the formula:

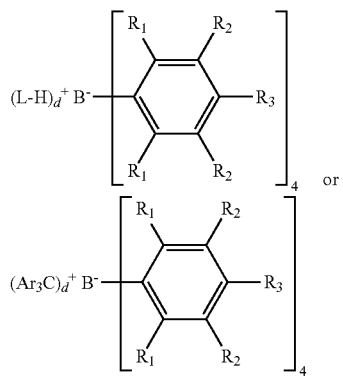

where:
each $R_1$ is independently a halide, such as a fluoride;
Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R_2$ is independently a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_3$ is a fluoride or a $C_6$ perfluorinated aromatic hydrocarbyl group); where $R_2$ and $R_3$ can form one or more saturated or unsaturated, substituted or unsubstituted rings (such as $R_2$ and $R_3$ form a perfluorinated phenyl ring); and
L is a neutral Lewis base; (L-H)$^+$ is a Bronsted acid; d is 1, 2, or 3;
where the anion has a molecular weight of greater than 1020 g/mol; and where at least three of the substituents on the B atom each have a molecular volume of greater than 250 cubic Å, alternately greater than 300 cubic Å, or alternately greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3 Vs, where Vs is the scaled volume. Vs is the sum of the relative volumes of the constituent atoms, and is calculated from the molecular formula of the substituent using the following table of relative volumes. For fused rings, the Vs is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Exemplary activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, trimethylammonium tetrakis(perfluorophenyl)borate, triphenylcarbenium tetrakis(perfluorophenyl)borate, 1-4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In at least one embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium)tetrakis(3,5-bis(trifluoromethyl) phenyl)borate, and di-(i-propyl)ammonium tetrakis(pentafluorophenyl)borate (where alkyl is methyl, ethyl, propyl, n-butyl, sec-butyl, or t-butyl).

Suitable activator-to-catalyst ratio, e.g., all NCA activators-to-catalyst ratio is about a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator).

Useful chain transfer agents can be alkylalumoxanes, a compound represented by the formula $AlR_3$, $ZnR_2$ (where each R is, independently, a $C_1$-$C_{18}$ aliphatic radical, such as methyl, ethyl, propyl, butyl, pentyl, hexyl, octyl, decyl, dodecyl, tetradecyl, hexadecyl, octadecyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Metal Hydrocarbenyl Transfer Agents (Aluminum Vinyl Transfer Agents)

The catalyst systems described herein further include a metal hydrocarbenyl transfer agent (which is any group 12 or 13 metal agent that contains at least one transferrable group that has an allyl chain end), such as an aluminum vinyl-transfer agent, also referred to as an AVTA, (which is any aluminum agent that contains at least one transferrable group that has an allyl chain end). An allyl chain end is represented by the formula $H_2C=CH-CH_2-$. "Allylic vinyl group," "allyl chain end," "vinyl chain end," "vinyl termination," "allylic vinyl group," "terminal vinyl group," and "vinyl terminated" are used interchangeably herein and refer to an allyl chain end. An allyl chain end is not a vinylidene chain end or a vinylene chain end. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer.

Useful transferable groups containing an allyl chain end are represented by the formula $CH_2=CH-CH_2-R^*$, where R* represents a hydrocarbyl group or a substituted hydrocarbyl group, such as a $C_1$ to C20 alkyl, such as methyl, ethyl, propyl, butyl, pentyl, hexyl, heptyl, octyl, nonyl, decyl, undecyl, dodecyl, or an isomer thereof.

In the catalyst system described herein, the catalyst undergoes alkyl group transfer with the transfer agent, which enables the formation of polymer chains containing one or more allyl chain ends.

Useful transferable groups containing an allyl chain end also include those represented by the formula $CH_2=CH-CH_2-R^{}$, where R represents a hydrocarbeneyl group or a substituted hydrocarbeneyl group, such as a $C_1$ to $C_{20}$ alkylene, such as methylene ($CH_2$), ethylene $[(CH_2)_2]$, propandiyl $[(CH_2)_3]$, butandiyl $[(CH_2)_4]$, pentandiyl $[(CH_2)_5]$, hexandiyl $[(CH_2)_6]$, heptandiyl $[(CH_2)_7]$, octandiyl $[(CH_2)_8]$, nonandiyl $[(CH_2)_9]$, decandiyl $[(CH_2)_{10}]$, undecandiyl $[(CH_{20})_{11}]$, dodecandiyl $[(CH_2)_{12}]$, or an isomer thereof. Suitable transferable groups are non-substituted linear hydrocarbeneyl groups. For instance, at least one R** is a $C_4$-$C_{20}$ hydrocarbenyl group.

The term "hydrocarbeneyl" refers to a hydrocarb-di-yl divalent group, such as a $C_1$ to $C_{20}$ alkylene (i.e., methylene ($CH_2$), ethylene $[(CH_2)_2]$, propandiyl $[(CH_2)_3]$, butandiyl $[(CH_2)_4]$, pentandiyl $[(CH_2)_5]$, hexandiyl $[(CH_2)_6]$, heptandiyl $[(CH_2)_7]$, octandiyl $[(CH_2)_8]$, nonandiyl $[(CH_2)_9]$, decandiyl $[(CH_2)_{10}]$, undecandiyl $[(CH_2)_{11}]$, dodecandiyl $[(CH_2)_{12}]$, and isomers thereof).

AVTA's are alkenylaluminum reagents capable of causing group exchange between the transition metal of the catalyst system ($M^{TM}$) and the metal of the AVTA ($M^{AVTA}$). The reverse reaction may also occur such that the polymeryl chain is transferred back to the transition metal of the catalyst system. This reaction scheme is illustrated below:

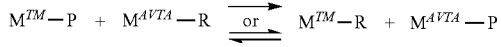

where $M^{TM}$ is an active transition metal catalyst site and P is the polymeryl chain, $M^{AVTA}$ is the metal of the AVTA, and R is a transferable group containing an allyl chain end, such as a hydrocarbyl group containing an allyl chain end, also called a hydrocarbenyl or alkenyl group.

Suitable catalyst systems of the present disclosure have high rates of olefin propagation and negligible or no chain termination via beta hydride elimination, beta methyl elimination, or chain transfer to monomer relative to the rate of chain transfer to the AVTA or other chain transfer agent, such as an aluminum alkyl, if present. Quinolinyldiamido catalyst complexes (see US 2018/0002352) and/or other catalyst compounds (U.S. Pat. Nos. 7,973,116; 8,394,902; 8,674,040; 8,710,163; 9,102,773; 2014/0256893; 2014/0316089; and US 2015/0141601) activated with non-coordinating activators such as dimethylanilinium tetrakis(perfluorophenyl)borate and/or dimethylanilinium tetrakis (perfluoronaphthyl)borate are particularly useful in the catalyst systems of the present disclosure.

In at least one embodiment of the present disclosure, the catalyst system includes an aluminum vinyl transfer agent, which is represented by the formula (A):

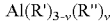

where R' is a hydrocarbyl group containing 1 to 30 carbon atoms, R" is a hydrocarbenyl group containing 4 to 20 carbon atoms having an allyl chain end, and v is 0.1 to 3, alternately 1 to 3, alternately 1.1 to less than 3, alternately v is 0.5 to 2.9, 1.1 to 2.9, alternately 1.5 to 2.7, alternately 1.5 to 2.5, alternately 1.8 to 2.2. Suitable compounds represented by the formula $Al(R')_{3-v}(R'')_v$ are neutral species, but anionic formulations may be envisioned, such as those represented by formula (B): $[Al(R')_{4-w}(R'')_w]^-$, where w is 0.1 to 4, R' is a hydrocarbyl group containing 1 to 30 carbon atoms, and R" is a hydrocarbenyl group containing 4 to 20 carbon atoms having an allyl chain end.

In at least one embodiment of any formula for a metal hydrocarbenyl transfer agent, such as formula A or B, described herein, each R' is independently chosen from $C_1$ to $C_{30}$ hydrocarbyl groups (such as a $C_1$ to $C_{20}$ alkyl groups, such as methyl, ethyl, propyl, butyl, pentyl, hexyl, heptyl, octyl, nonyl, decyl, undecyl, dodecyl, or an isomer thereof), and R is represented by the formula:

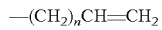

$-(CH_2)_n CH=CH_2$ where n is an integer from 2 to 18, such as 6 to 18, such as 6 to 12, such as 6.

In at least one embodiment of the present disclosure, particularly useful AVTAs include, but are not limited to, tri(but-3-en-1-yl)aluminum, tri(pent-4-en-1-yl)aluminum, trioct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, diisobutyl(dodec-11-en-1-yl)aluminum, and the like. Mixtures of one or more AVTAs may also be used. In some embodiments of the present disclosure, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum are suitable.

Metal hydrocarbenyl transfer agents can include one or more of tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, tri(dodec-11-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, dimethyl(dec-9-en-1-yl)aluminum, diethyl(dec-9-en-1-yl)aluminum, dibutyl(dec-9-en-1-yl)aluminum, diisobutyl(dec-9-en-1-yl)aluminum, and diisobutyl(dodec-11-en-1-yl)aluminum, methyl-di(oct-7-en-1-yl)aluminum, ethyl-di(oct-7-en-1-yl)aluminum, butyl-di(oct-7-en-1-yl)aluminum, isobutyl-di(oct-7-en-1-yl)aluminum, isobutyl-di(non-8-en-1-yl)aluminum, methyl-di(dec-9-en-1-yl)aluminum, ethyl-di(dec-9-en-1-yl)aluminum, butyl-di(dec-9-en-1-yl)aluminum, isobutyl-di(dec-9-en-1-yl)aluminum, and isobutyl-di(dodec-11-en-1-yl)aluminum.

Aluminum vinyl transfer agents can include organoaluminum compound reaction products between aluminum reagent ($AlR_3$) and an alkyl diene. Suitable alkyl dienes include those that have two "alpha olefins", as described above, at two termini of the carbon chain. The alkyl diene can be a straight chain or branched alkyl chain and substituted or unsubstituted. Exemplary alkyl dienes include but are not limited to, for example, 1,3-butadiene, 1,4-pentadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-eicosadiene, 1,20-heneicosadiene, etc. Exemplary aluminum reagents include triisobutylaluminum, diisobutylaluminumhydride, isobutylaluminumdihydride and aluminum hydride ($AlH_3$).

In at least one embodiment, R" is butenyl, pentenyl, heptenyl, octenyl or decenyl, such as R" is octenyl or decenyl. R' can be methyl, ethyl, propyl, isobutyl, or butyl, such as R' is isobutyl.

In at least one embodiment of the present disclosure, v is about 2, or v is 2.

In at least one embodiment, v is about 1, or v is 1, such as from about 1 to about 2.

v can be an integer or a non-integer, such as v is from 1.1 to 2.9, such as from about 1.5 to about 2.7, e.g., such as from about 1.6 to about 2.4, such as from about 1.7 to about 2.4, such as from about 1.8 to about 2.2, such as from about 1.9 to about 2.1 and all ranges there between.

In at least one embodiment of the present disclosure, R' is isobutyl and each R" is octenyl or decenyl, such as R' is isobutyl, each R" is octenyl or decenyl, and v is from 1.1 to 2.9, such as from about 1.5 to about 2.7, e.g., such as from about 1.6 to about 2.4, such as from about 1.7 to about 2.4, such as from about 1.8 to about 2.2, such as from about 1.9 to about 2.1.

The amount of v (the aluminum alkenyl) is described using the formulas: $(3-v)+v=3$, and $Al(R')_{3-v}(R'')_v$ where R" is a hydrocarbenyl group containing 4 to 20 carbon atoms having an allyl chain end, R' is a hydrocarbyl group containing 1 to 30 carbon atoms, and v is 0.1 to 3 (such as 1.1 to 3). This formulation represents the observed average of organoaluminum species (as determined by $^1$H NMR) present in a mixture, which may include any of $Al(R')_3$, $Al(R')_2(R'')$, $Al(R')(R'')_2$, and $Al(R'')_3$. $^1$H NMR spectroscopic studies are performed at room temperature using a Bruker 400 MHz NMR. Data is collected using samples prepared by dissolving 10-20 mg the compound in 1 mL of $C_6D_6$. Samples are then loaded into 5 mm NMR tubes for data collection. Data is recorded using a maximum pulse width of 45°, 8 seconds between pulses and signal averaging either 8 or 16 transients. The spectra are normalized to protonated tetrachloroethane in the C6D6. The chemical shifts (δ) are reported as relative to the residual protium in the deuterated solvent at 7.15 ppm.

In still another aspect, the aluminum vinyl-transfer agent has less than 50 wt % dimer present, based upon the weight of the AVTA, such as less than 40 wt %, such as less than 30 wt %, such as less than 20 wt %, such as less than 15 wt %, such as less than 10 wt %, such as less than 5 wt %, such as less than 2 wt %, such as less than 1 wt %, such as 0 wt % dimer. Alternately dimer is present at from 0.1 to 50 wt %, alternately 1 to 20 wt %, alternately at from 2 to 10 wt %. Dimer is the dimeric product of the alkyl diene used in the preparation of the AVTA. The dimer can be formed under certain reaction conditions, and is formed from the insertion of a molecule of diene into the Al-R bond of the AVTA, followed by beta-hydride elimination. For example, if the alkyl diene used is 1,7-octadiene, the dimer is 7-methylenepentadeca-1,14-diene. Similarly, if the alkyl diene is 1,9-decadiene, the dimer is 9-methylenenonadeca-1,18-diene.

Useful compounds can be prepared by combining an aluminum reagent (such as alkyl aluminum) having at least one secondary alkyl moiety (such as triisobutylaluminum) and/or at least one hydride, such as a dialkylaluminum hydride, a monoalkylaluminum dihydride or aluminum trihydride (aluminum hydride, $AlH_3$) with an alkyl diene and heating to a temperature that causes release of an alkylene byproduct. The use of solvent(s) is not required. However, non-polar solvents can be employed, such as, as hexane, pentane, toluene, benzene, xylenes, and the like, or combinations thereof.

In at least one embodiment of the present disclosure, the AVTA is free of coordinating polar solvents such as tetrahydrofuran and diethylether.

After the reaction is complete, solvent if, present can be removed and the product can be used directly without further purification.

The AVTA to catalyst complex equivalence ratio can be from about 1:100 to 500,000:1. For example, the molar ratio of AVTA to catalyst complex can be greater than 5, alternately greater than 10, alternately greater than 15, alternately greater than 20, alternately greater than 25, alternately greater than 30.

In another embodiment of the present disclosure, the metal hydrocarbenyl transfer agent is an alumoxane formed from the hydrolysis of the AVTA. Alternatively, the alumoxane can be formed from the hydrolysis of the AVTA in combination with other aluminum alkyl(s). The alumoxane component is an oligomeric compound which is not well characterized, but can be represented by the general formula $(R\text{—}Al\text{—}O)_m$ which is a cyclic compound, or may be $R'(R\text{—}Al\text{—}O)_m\text{—}AlR'_2$ which is a linear compound where R' is as defined above and at least one R' is the same as R (as defined above), and m is from about 4 to 25, such as with a range of 13 to 25. In at least one embodiment, all R' are R. An alumoxane is generally a mixture of both the linear and cyclic compounds.

In at least one embodiment of the present disclosure, the metal hydrocarbenyl chain transfer agent is represented by the formula: $Al(R')_{3-v}(R'')v$ where each R independently is a $C_1$-$C_{30}$ hydrocarbyl group, each R'', independently, is a $C_4$-$C_{20}$ hydrocarbenyl group having an end-vinyl group, and v is from 0.1 to 3, such as each R'', independently, is a $C_4$-$C_{20}$ hydrocarbenyl group having an allyl chain end and v is from 0.1 to 3, such as v=2.

Polymerization Processes

The present disclosure relates to polymerization processes where monomer (such as propylene), and optionally comonomer, are contacted with a catalyst system including an activator, a metal hydrocarbenyl chain transfer agent, and a catalyst compound, as described above. The catalyst compound and activator may be combined in any order, and may be combined prior to contacting with the monomer.

Catalyst complexes are useful in polymerizing unsaturated monomers conventionally known to undergo coordination-catalyzed polymerization such as solution, slurry, gas-phase, and high-pressure polymerization. Solution phase polymerizations are preferred and may be performed in batch reactors or continuous stirred tank, plug flow, or loop reactors.

For purposes of the present disclosure, one or more reactors in series or in parallel may be used.

The complexes, activator, transfer agent, and, when required, co-activator, may be delivered as a solution or slurry, either separately to the reactor, activated in-line just prior to the reactor, or pre-activated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to the first reaction and another component to other reactors. In at least one embodiment, the complex is activated in the reactor in the presence of olefin and transfer agent.

In at least one embodiment, the polymerization process is a continuous process performed in one or more continuous stirred tank reactors in series or in parallel.

Polymerization processes of the present disclosure can include contacting one or more alkene monomers with the complexes, activators and transfer agents described herein. For purpose of the present disclosure, alkenes are defined to include multi-alkenes (such as dialkenes) and alkenes having just one double bond. Polymerization may be homogeneous (solution or bulk polymerization) or heterogeneous (slurry in a liquid diluent, or gas phase-in a gaseous diluent). Chain transfer agents that cause irreversible chain transfer, such as hydrogen, silanes, or certain metal alkyls, are called chain terminating agents and may be used in the practice of the present disclosure.

A solution polymerization means a polymerization process in which the polymer is dissolved in a liquid polymerization medium, such as an inert solvent or monomer(s) or their blends. Commonly, a solution polymerization is homogeneous. A homogeneous polymerization is one where the polymer product is dissolved in the polymerization medium. For example, such systems can be not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

The present polymerization processes may be conducted under conditions, for instance, including a temperature of about 30° C. to about 200° C., such as from 60° C. to 195° C., such as from 70° C. to 190° C., such as from 75° C. to 150° C., such as from 85° C. to 125° C. such as from 90° C. to 100° C., such as 95° C. Preferably the process is conducted at a temperature of (70° C. to 150° C., alternately 80° C. to 120° C., alternately 90° C. to 100° C.). The process may be conducted at a pressure of from 0.05 MPa to 1500 MPa. In at least one embodiment, the pressure is between 0.1 MPa and 40 MPa, or in another embodiment the pressure is between 1.7 MPa and 30 MPa, or in another embodiment, especially under supercritical conditions, the pressure is between 15 MPa and 1500 MPa.

If branching (such as a $g'_{vis}$ of less than 0.98, preferably 0.97 or less) is desired in the polymer product, then, among other things, one may increase the concentration of the metal hydrocarbenyl transfer agent, increase the temperature of the polymerization reaction, increase the solids content in the polymerization reaction mass (i.e., increase the solids content) or increase the residence time of the polymerization. Likewise, if a more linear polymer is desired, then, among other things, one may reduce the concentration of the metal hydrocarbenyl transfer agent, reduce the temperature of the polymerization reaction, reduce the solids content in the polymerization reaction mass (i.e., increase the solids content) or reduce the residence time of the polymerization.

For example, in a polymerization, the run time of the reaction is up to 300 minutes, such as from about 5 minutes to 250 minutes, such as from about 10 minutes to 120 minutes.

In at least one embodiment, hydrogen is present in the polymerization reactor at a partial pressure of from 0.1 psig to 1,000 psig (0.0007 MPa to 6.895 MPa), such as from 0.1 psig to 500 psig (0.007 MPa to 3.45 MPa), such as 10 psig to 100 psig (0.069 MPa to 0.689 MPa).

In at least one embodiment, the efficiency of the catalyst compound is at least 1,000 gP/gCat, such as 5,000 gP/gCat or more, such as 10,000 gP/gCat or more, such as 50,000 gP/gCat or more, such as 100,000 gP/gCat or more, such as 200,000 gP/gCat or more.

In at least one embodiment, the conversion of olefin monomer is at least 10%, based upon polymer yield and the weight of the monomer entering the reaction zone, such as 20% or more, such as 30% or more, such as 40% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the propylene-based polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

Monomers

Monomers include substituted or unsubstituted $C_3$ to $C_{40}$ alpha olefins, such as $C_3$ to $C_{20}$ alpha olefins, such as $C_3$ to $C_{12}$ alpha olefins, such as propylene, butene, pentene, hexene, heptene, octene, nonene, decene, undecene, dodecene and isomers thereof. In at least one embodiment, the monomer includes propylene and an optional comonomer including one or more $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer includes propylene and an optional comonomer including one or more $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_3$ to $C_{40}$ olefin monomers and optional comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 wt % to 1.0 wt %, such as 0.002 wt % to 0.5 wt %, such as 0.003 wt % to 0.2 wt %, based upon the total weight of the composition. In some embodiments, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

Diolefin monomers include any suitable hydrocarbon structure, such as $C_4$ to $C_{30}$, having at least two unsaturated bonds, where at least two of the unsaturated bonds are readily incorporated into a polymer by either a stereospecific or a non-stereospecific catalyst(s). The diolefin monomers can be selected from alpha, omega-diene monomers (i.e., di-vinyl monomers). The diolefin monomers can be linear di-vinyl monomers, such as those containing from 4 to 30 carbon atoms. Dienes can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, for example dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes can include cyclopentadiene, vinylnorbornene, norbornadiene, ethylidene norbornene, divinylbenzene, dicyclopentadiene or higher ring containing diolefins with or without substituents at various ring positions.

Where olefins are used that give rise to short chain branching, such as propylene, the catalyst systems may, under appropriate conditions, generate stereoregular polymers or polymers having stereoregular sequences in the polymer chains.

In at least one embodiment, the catalyst systems described herein are used in any polymerization process described above to produce propylene polymers or copolymers. In at least one embodiment, the catalyst systems described herein are used in any polymerization process described above to produce branched propylene polymers.

In at least one embodiment, ethylene can be used as a comonomer. In a preferred embodiment, the branched propylene polymer comprises less than 1% ethylene, preferably less than 0.5% ethylene, preferably 0% ethylene.

Scavengers

In at least one embodiment, when using a catalyst system described herein, a catalyst system will additionally include one or more scavenging compounds. Here, the term scavenging compound means a compound that removes polar impurities from the reaction environment. These impurities adversely affect catalyst activity, stability and efficiency. For example, the scavenging compound will be an organometallic compound such as the Group 13 organometallic compounds of U.S. Pat. Nos. 5,153,157; 5,241,025; WO 1991/09882; WO 1994/03506; WO 1993/14132; and that of WO 1995/07941. Exemplary compounds include triethyl aluminum, triethyl borane, tri-iso-butyl aluminum, methyl alumoxane, iso-butyl alumoxane, tri-n-octyl aluminum, bis(diisobutylaluminum)oxide, modified methylalumoxane. (Useful modified methylalumoxane include cocatalyst type 3A (commercially available from Akzo Chemicals, Inc. under the trade name Modified Methylalumoxane type 3A) and those described in U.S. Pat. No. 5,041,584). Those scavenging compounds having bulky or $C_6$-$C_{20}$ linear hydrocarbyl substituents connected to the metal or metalloid center usually minimize adverse interaction with the active catalyst. Examples include bulky compounds such as triethylaluminum, such as tri-iso-butyl aluminum, such as tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=C$_6$F$_5$).

In at least one embodiment, a transfer agent, such as an AVTA, may also function as a scavenger.

In at least one embodiment, two or more catalyst complexes as described herein are combined with a chain transfer agent, such as TNOAL, in the same reactor with monomer. Alternately, one or more complexes are combined with another catalyst (such as a metallocene) and a chain transfer agent, such as TNOAL, in the same reactor with monomer.

Polymer Products

While the molecular weight of the polymers produced herein is influenced by reactor conditions including temperature, monomer concentration and pressure, the presence of hydrocarbenyl chain transfer agents, chain terminating agents and the like, the branched propylene polymers and copolymer products produced by the present process may have an Mw of about 1,000 g/mol to about 2,000,000 g/mol, alternately of about 30,000 g/mol to about 600,000 g/mol, alternately of about 100,000 g/mol to about 500,000 g/mol, alternately of about 130,000 g/mol to about 400,000 g/mol, as determined by Gel Permeation Chromatography. Exemplary polymers produced herein may be propylene polymers or copolymers. In at least one embodiment, the comonomer(s) can be present at up to 20 mol %, such as from 0.01 mol % to 15 mol %, such as 1 mol % to 10 mol %. In at least one embodiment, the comonomer(s) can be present at up to 25 wt %, such as from 0.01 wt % to 25 wt %, such as 1 wt % to 20 wt %, such as from 5 wt % to 10 wt %, with the rest being made up of the main monomer, such as propylene.

In a preferred embodiment of the invention, the branched propylene polymers (such as propylene homo- and/or co-copolymer) produced by the present process may have an Mw of about 1,000 g/mol to about 2,000,000 g/mol, alternately of about 30,000 g/mol to about 600,000 g/mol, alternately of about 100,000 g/mol to about 500,000 g/mol, alternately of about 130,000 g/mol to about 400,000 g/mol, as determined by Gel Permeation Chromatography; and have comonomer(s) present at from 0 to 20 mol %, such as from 0.01 mol % to 15 mol %, such as 1 mol % to 10 mol %, with propylene making up the rest of the copolymer. In at least one embodiment, the propylene is present at 99.9 to 75 wt %, (preferably 99.5 wt % to 75 wt %, preferably 99 wt % to 80 wt %, preferably 95 wt % to 90 wt %) and the comonomer(s) is present at 0.1 to 25 wt %, (preferably 0.5 wt % to 25 wt %, preferably 1 wt % to 20 wt %, preferably 5 wt % to 10 wt %), based upon the weight of the copolymer, and the wt % of the remnant of the metal hydrocarbenyl chain transfer agent is excluded.

In a least one embodiment, the branched propylene polymer is 90 wt % or greater propylene, alternatively 95 wt % or greater propylene, alternatively 98 wt % propylene or greater, alternatively 99 wt % propylene or greater, alternatively 100 wt % propylene wherein the wt % is based on propylene monomer and comonomer(s), and the wt % of the remnant of the metal hydrocarbenyl chain transfer agent is excluded.

In a least one embodiment, the branched propylene polymer is 100 wt % propylene wherein the wt % is based on propylene monomer and the wt % of the remnant of the metal hydrocarbenyl chain transfer agent is excluded.

In a preferred embodiment, the branched propylene polymer comprises less than 1 wt % ethylene, preferably less than 0.5 wt % ethylene, preferably 0 wt % ethylene.

In a preferred embodiment, the branched propylene polymer comprises less than 0.1 wt % diene, preferably less than 0.05 wt % diene, preferably 0 wt % diene.

In a preferred embodiment, the branched propylene polymer comprises a remnant of the metal hydrocarbenyl chain transfer agent (preferably from 0.001 to 10 mol %, alternatively from 0.01 to 5 mol %, alternatively 0.01 to 2 mol %, alternatively 0.01 to 1 mol %).

For purposes of this invention and the claims thereto, when a polymer is referred to as comprising a metal hydrocarbenyl chain transfer agent, the metal hydrocarbenyl chain transfer agent present in such polymer or copolymer is the polymerized portion of the metal hydrocarbenyl chain transfer agent, also referred to as the remnant of the metal hydrocarbenyl chain transfer agent. The remnant of a metal hydrocarbenyl chain transfer agent is defined to be the portion of the metal hydrocarbenyl chain transfer agent containing an allyl chain end that becomes incorporated into the polymer backbone. For example if the allyl chain end of the metal hydrocarbenyl chain transfer agent is $CH_2$=CH—$(CH_2)_6$, the "$CH_2$—CH" carbons of the metal hydrocarbenyl chain transfer agent become a part of the polymer backbone and the —$(CH_2)_6$, becomes a part of a side chain.

In at least one embodiment, a polymer is a branched propylene-polymer. Preferred branched propylene polymers herein typically include from about 90 wt % to wt % 100% propylene, wherein said branched propylene polymers have: a) a g'$_{vis}$ of 0.97 or less; b) a strain hardening ratio of 1 or greater; c) an Mw of 50,000 g/mol or more; and d) an Mw/Mn of 4 or less.

In any embodiment described herein, the branched propylene polymer may have a) a g'vis of 0.97 or less; b) a strain hardening ratio of 1 or greater; c) an Mw of 50,000 g/mol or more; and d) an Mw/Mn of 4 or less.

In a preferred embodiment of the invention, the branched propylene polymers produced by the present process have:
a) an Mw of about 1,000 g/mol to about 2,000,000 g/mol (alternately 50,000 g/mol or more, alternately about 30,000 g/mol to about 600,000 g/mol, alternately about 100,000 g/mol to about 500,000 g/mol, alternately about 130,000 g/mol to about 400,000 g/mol, as determined by Gel Permeation Chromatography);
b) comonomer(s) present at 0 to 20 mol % (such as from 0.01 mol % to 15 mol %, such as 1 mol % to 10 mol %, with propylene making up the rest of the polymer);
c) a g'$_{vis}$ of 0.97 or less (preferably 0.95 or less, preferably 0.93 or less, preferably 0.90 or less, alternately 0.85 or less, alternately 0.80 or less, alternately 0.75 or less, alternately 0.70 or less, alternately 0.60 or less);
d) a strain hardening ratio of 1 or greater (preferably such as 5 or more, alternately 10 or more, alternately 20 or more, alternately 30 or more, alternately 40 or more, alternately 50 or more); and
e) an Mw/Mn of 4 or less (preferably from greater than 1 to 4, preferably from 1.5 to 3).

In any embodiment of the invention described herein, a propylene polymer produced herein has a g'vis of 0.97 or less (preferably 0.95 or less, preferably 0.93 or less, preferably 0.90 or less, alternately 0.85 or less, alternately 0.80 or less, alternately 0.75 or less, alternately 0.70 or less, alternately 0.60 or less).

In any embodiment of the invention described herein, the propylene polymer has (at 190° C.) one or more of:
a power law index of from about 0.38 to about 0.63;
transition index of from about 0.24 to about 0.52;
consistency (characteristic time) of from about 7 s to about 1.5 s;
infinite-rate viscosity of from about −181.8 to about −143 Pa·s; and
zero-shear viscosity of from about 117 kPa·s to about 3.9 kPa·s.

In any embodiment of the invention described herein, the propylene polymer has a shear thinning index at 190° C. of from 1 to 11, preferably from 4 to 7.

In any embodiment of the invention described herein, the propylene polymer has a terminal unsaturation of 80% or more, based upon the number of the total unsaturations.

In any embodiment of the invention described herein, a propylene polymer produced herein has an MFR (in g/10 min per ASTM D1238 at 230° C./2.16 kg test conditions) from 0.1 g/10 min to 100 g/10 min, such as from 1.0 g/10 min to 100 g/10 min, such as from 4 g/10 min to 80 g/10 min, such as from 5 g/10 min to 65 g/10 min, alternately from 3 g/10 min to 70 g/10 min.

In any embodiment of the invention described herein, a propylene polymer produced herein a high-load melt flow rate, HLMFR (in g/10 min per ASTM D1238 at 230° C./21.6 kg test conditions), from 1.0 g/10 min to 100 g/10 min, such as from 3.0 g/10 min to 60 g/10 min, such as from 5.0 g/10 min to 50 g/10 min, such as from 10 g/10 min to 30 g/10 min.

In any embodiment of the invention described herein, a propylene polymer produced herein has an Mw from 100,000 g/mol to 400,000 g/mol, such as from 120,000 g/mol to 380,000 g/mol, such as from 140,000 g/mol to 360,000 g/mol, such as from 160,000 g/mol to 340,000 g/mol, such as from 180,000 g/mol to 320,000 g/mol.

In any embodiment of the invention described herein, a propylene polymer produced herein an Mn from 20,000 g/mol to 200,000 g/mol, such as from 30,000 g/mol to 195,000 g/mol, such as from 40,000 g/mol to 190,000 g/mol, such as from 50,000 g/mol to 185,000 g/mol.

In any embodiment of the invention described herein, a propylene polymer produced herein has an Mw/Mn value from 1.0 to 4, s such as from 1.5 to 3.5, such as from 2.0 to 3.0.

In any embodiment of the invention described herein, a propylene polymer produced herein has a DSC melting point of greater than 100° C., such as greater than 105° C., such as greater than 110° C., such as greater than 115° C. and a DSC melting point of less than 160° C., such as less than 145° C., such as less than 130° C., such as less than 120° C.

In any embodiment of the invention described herein, a propylene polymer produced herein has a DSC peak crystallization temperature, $T_c$ (also referred to as crystallization temperature), of greater than 63° C., such as greater than 64° C., such as greater than 65° C., such as greater than 66° C. Preferably, a polymer of the present disclosure has a DSC peak crystallization temperature, $T_c$, of 62 to 160° C., such as 63 to 145° C., such as 64 to 130° C., such as 65 to 120° C.

In any embodiment of the invention described herein, a propylene polymer produced herein has a DSC melt enthalpy of greater than 35 J/g, such as greater than 40 J/g, such as greater than 42 J/g, such as greater than 45 J/g. A polymer of the present disclosure can have a DSC melt enthalpy of less than 90 J/g, such as less than 70 J/g, such as less than 60 J/g, such as less than 50 J/g.

In any embodiment of the invention described herein, a propylene polymer produced herein has a heat of fusion as determined by DSC of greater than 35 J/g, such as greater than 40 J/g, such as greater than 42 J/g, such as greater than 45 J/g and preferably less than 90 J/g, such as less than 70 J/g, such as less than 60 J/g, such as less than 50 J/g.

Preferably, the branched propylene polymer produced herein is gel free. Presence of gel can be detected by dissolving the material in xylene at xylene's boiling temperature (140° C.) and measuring the amount of gel present (See ASTM D 5492, except that 140° C. is used rather than 20° C.). In any embodiment, the branched propylene polymer has 5 wt % or less (preferably 4 wt % or less, preferably 3 wt % or less, preferably 2 wt % or less, preferably 1 wt % or less, preferably 0 wt %) of xylene insoluble material.

In any embodiment of the invention described herein, a propylene polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Moments of Molecular weight and other property measurement methods are described in the Experimental Section.

In any embodiment of the invention described herein, a propylene polymer produced herein has an Mz/Mw from 1 to 10, such as from 2 to 7, such as from 2 to 5, such as from 2 to 3. Polymers produced herein have an Mz/Mn from 1 to 10, such as from 2 to 6, such as from 3 to 5.

The molecular weight distribution that can be quantified using a ratio of different molecular weight moments ($M_n$—number-average molecular weight, $M_w$—weight-average molecular weight, $M_z$—Z-average molecular weight, etc.) can have a significant effect on the shear-rate/frequency dependence of the steady-shear/complex viscosity (W. Graessley and L. Segal, AIChE., 1970, 16, 261; D. Nicheti and I. Manas-Zloczower, J. Rheol., 1998, 42(4), 951). For example, for samples with similar $M_w$, a high $M_w/M_c$ or $M_z/M_w$ tends to indicate an earlier onset of shear thinning behavior with respect to the sample with lower $M_w/M_n$ or $M_z/M_w$ values. Therefore, a polymer with a larger $M_w/M_n$ or $M_z/M_w$ ratio would be expected to have a lower viscosity at high shear rates than a polymer with a similar weight-average molecular weight but a smaller value of $M_w/M_n$ or $M_z/M_w$ ratio.

Polymers of the present disclosure can have a high degree of terminal unsaturation, e.g. vinyl end groups. In at least one embodiment, a polymer has a terminal unsaturation of 50% or more of the total unsaturations, such of 70% or more of the total unsaturations, of 85% or more of the total unsaturations, of 95% or more of the total unsaturations. Terminal unsaturation can provide reactive end groups of polymers for functionalization.

Unsaturation (internal and terminal) in a polymer can be determined by $^1$H NMR with reference to *Macromolecules,* 2014, 47, 3782 and *Macromolecules,* 2005, 38, 6988, but in event of conflict *Macromolecules,* 2014, 47, 3782 shall control. Peak assignments are determined referencing the solvent of tetrachloroethane-1,2 $d_2$ at 5.98 ppm. Specifically, percent internal unsaturation is determined by adding Vy1+ Vy2+trisubstituted olefins then dividing by total unsaturation.

The effect of long-chain branching on rheological signal of the samples with similar polydispersity of molecular weights can be presented by plotting the phase angle (δ) versus the absolute value of the complex shear modulus (G*) to produce a Van Gurp-Palmen plot (Trinkle S., P. Walter, C. Friedrich, *Rheol. Acta* 2002, 41, 103). The plot of conventional polypropylene polymers shows monotonic behavior and a negative slope toward higher G* values. Conventional polypropylene without long chain branches tend to exhibit a negative slope on the Van Gurp-Palmen plot. The Van Gurp-Palmen plots of some embodiments of the branched propylene polymers described in the present disclosure exhibit two slopes—a positive slope at lower G* values and a negative slope at higher G* values.

Useful branched polypropylene polymers used herein have good shear thinning.

Shear thinning is determined by fitting complex viscosity versus radial frequency curve with Carreau-Yasuda model. Shear thinning can be also characterized using a shear thinning index. Shear thinning is characterized by the decrease of the complex viscosity with increasing angular frequency.

The term "shear thinning index" is determined using plots of the logarithm (base ten) of the complex viscosity versus logarithm (base ten) of the frequency. The slope is the difference in the log (complex viscosity) at a frequency of 100 rad/s and the log (complex viscosity) at a frequency of 0.01 rad/s divided by 4. These plots are exemplary output of small amplitude oscillatory shear (SAOS) experiments. For purposes of the present disclosure, the SAOS test temperature is 190° C. for propylene polymers and blends thereof. Polymer viscosity is conveniently measured in Pascal*seconds (Pa*s) as function of radial frequencies within a range of from 0.01 to 628 rad/sec and at 190° C. under a nitrogen atmosphere using a dynamic mechanical spectrometer such as the TA Instruments Advanced Rheometrics Expansion System (ARES-G2). Generally a low value of shear thinning index indicates that the polymer is highly shear-thinning and that it is readily processable in high shear processes, for example by injection molding. The more negative this slope, the faster the complex viscosity decreases as the frequency increases.

In at least one embodiment, the branched propylene polymers have a shear thinning index at 190° C. of from 1 to 11, such as from 2 to 10, such as from 3 to 9, such as from 4 to 7.

Additionally, suitable branched propylene polymers useful herein can have characteristics of strain hardening in extensional viscosity. An important feature that can be obtained from extensional viscosity measurements is the attribute of strain hardening in the molten state (see, for example, FIG. 1). Strain hardening is observed as a sudden, abrupt upswing of the extensional viscosity in the transient extensional viscosity vs. time plot. This abrupt upswing, away from the linear viscoelastic behavior, was reported in the 1960s for LDPP and LDPE (reference: J. Meissner, Rheol. Acta., Vol. 8, 78, 1969) and was attributed to the presence of long branches in the polymer. The strain-hardening ratio (SHR) is defined as the ratio of the maximum transient extensional viscosity at certain strain rate over the respective value of the linear viscoelasticity envelop (LVE) (FIG. 1):

$$SHR(\dot{\varepsilon}, t) = \eta_E^+(\dot{\varepsilon}, t)/3\eta^+(t),$$

where linear viscoelasticity envelop $\eta^+(t)$ is computed as following:

$$\eta^+(t) = \Sigma_{i=1}^N g_i \lambda_i (1 - \exp(-t/\lambda_i)),$$

with parameters $g_i$ and $\lambda_i$ obtained by fitting storage and loss moduli:

$$G'(\omega) = \sum_{i=1}^N g_i \frac{(\omega\lambda_i)^2}{1+(\omega\lambda_i)^2}$$

$$G''(\omega) = \sum_{i=1}^N g_i \frac{\omega\lambda_i}{1+(\omega\lambda_i)^2}.$$

Strain hardening is present in the material when the ratio is greater than 1. In at least one embodiment, the branched propylene polymers show strain hardening in extensional flow. For instance, the strain hardening ratio is 2 or greater, such as 5 or greater, such as 10 or greater, such as 15 or more, when extensional viscosity is measured at a Hencky strain rate of from 0.01 sec$^{-1}$ to 10 sec$^{-1}$, such as 1 sec$_{-1}$, and at a temperature of 190° C.

The branched propylene polymers can also exhibit melt strength values greater than that of conventional linear or long chain branched polypropylene of similar melt index. As used herein, "melt strength" refers to the force required to draw a molten polymer extrudate at a rate of 12 mm/s$^2$ at an extrusion temperature of 190° C. until breakage of the extrudate whereby the force is applied by take up rollers. In at least one embodiment, the melt strength of the branched modifier polymer is at least 20% higher than that of a linear polypropylene with the same density and melt index.

In at least one embodiment, branched propylene polymers produced herein have a melt strength of at least about 10 cN, such as at least about 15 cN, such as at least about 20 cN, such as at least about 25 cN, such as at least about 30 cN.

In at least one embodiment, the branched propylene polymers have a strain hardening ratio of 1 or more, such as 5 or more, such as 10 or more, such as 20 or more, such as 30 or more, such as 40 or more, such as 50 or more.

The shear thinning is described by the following parameters: Power Law Index (slope of the viscosity vs frequency in the power-law regime), transition index (parameter describing the transition between Newtonian plateau and power law region), consistency (characteristic relaxation time of the polymer, inverse to the frequency correspondent to the transition from Newtonian to power-law regime), Infinite-Rate Viscosity, Zero-Shear Viscosity (as defined by fitting dependence of complex viscosity on angular frequency data by Carreau-Yasuda model using TA Instruments Trios v3.3.1.4246 software).

In at least one embodiment, a propylene polymer at 190° C. has:

a power law index of from about 0.38 to about 0.63;
transition index of from about 0.24 to about 0.52;
consistency (characteristic time) of from about 7 s to about 1.5 s;
infinite-rate viscosity of from about −181.8 to about −143 Pa·s; and
zero-shear viscosity of from about 117 kPa·s, to about 3.9 kPa·s, as defined by fitting dependence of complex viscosity on angular frequency data by Carreau-Yasuda model using TA Instruments Trios v3.3.1.4246 software.

$$\frac{\eta*(\omega) - \eta_\infty}{\eta_0 - \eta_\infty} = \frac{1}{[1+(k\omega)^a]^{(1-n)/a}},$$

with $\eta_0$ the zero-shear viscosity, $\eta_\infty$ the infinite viscosity, k the consistency and n the power law index and an a parameter describing the transition between Newtonian plateau and power law region.

End Uses

Polymers of the present disclosure may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Articles made using polymers produced herein may include, for example, molded articles (such as containers and bottles, e.g., household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

In particular, polymers produced by the process of the present disclosure and blends thereof are useful in such forming operations as film, sheet, and fiber extrusion and co-extrusion as well as blow molding, injection molding, roto-molding. Films include blown or cast films formed by coextrusion or by lamination useful as shrink film, cling film, stretch film, sealing film or oriented films.

EXPERIMENTAL

Diisobutylaluminum hydride (DIBAL-H) and triisobutyl aluminum (TIBAL) were purchased from Akzo Nobel and/or Sigma Aldrich and were used as received. 1,7-octadiene and 1,9-decadiene were purchased from Sigma Aldrich and purified by distillation from sodium metal under a nitrogen atmosphere prior to use. Synthetic procedures involving oxygen reactive species, such as organoaluminums and transition metals, were performed under inert atmosphere using glove box and Schlenk line techniques. Solvents use for the preparation of solutions for NMR spectroscopy were dried over 3 angstrom molecular sieves and sparged with nitrogen prior to use.

Gel Permeation Chromatography with Three Detectors (GPC-3D)

$M_w$, $M_n$, Mz, and $M_w/M_n$ are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 micron Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, IDRI, using the following equation:

$c = K_{DRI} I_{DRI} / (dn/dc)$ where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC method are such that concentration is expressed in g/cm3, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$\eta_s = c[\eta] + 0.3(c[\eta])2$ where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}.$$

$M_v$ is the viscosity-average molecular weight based on molecular weights determined by LS analysis, while a and K are as calculated in the published in literature (T. Sun, P. Brant, R. R. Chance, and W. W. Graessley, Macromolecules, Volume 34, Number 19, pp. 6812-6820, (2001)), except that for purposes of this invention and claims thereto, $\alpha=0.705$ and $K=0.0002288$ for propylene polymers. Concentrations are expressed in g/cm³, molecular weight is expressed in g/mole, and intrinsic viscosity (hence K in the Mark-Houwink equation) is expressed in dL/g unless otherwise noted.

This invention further relates to:
1. A process to produce branched propylene polymers comprising:
1) contacting monomer comprising propylene with a catalyst system comprising an activator, a metal hydrocarbenyl chain transfer agent, and a non-metallocene complex; and
2) obtaining a branched propylene polymer comprising from about 90 wt % or greater propylene, wherein said branched propylene polymer: a) has a $g'_{vis}$ of 0.97 or less; b) has strain hardening ratio of 1 or greater; c) has an Mw of 50,000 g/mol or more; and d) has a Mw/Mn of 4 or less.
2. The process of paragraph 1, wherein the catalyst compound is represented by Formula (I):

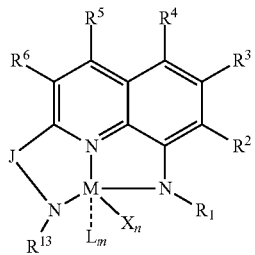

wherein:
M is a group 3, 4, or 5 metal;
J is a three-atom-length bridge between the quinoline and the amido nitrogen;
X is an anionic leaving group;
L is a neutral Lewis base;
$R^1$ and $R^{13}$ are independently selected from the group consisting of hydrocarbyls, substituted hydrocarbyls, and silyl groups;
$R^2$, $R^3$, $R^4$, $R^5$, and $R^6$ are independently selected from the group consisting of hydrogen, hydrocarbyls, alkoxy, silyl, amino, aryloxy, substituted hydrocarbyls, halogen, and phosphino;
n is 1 or 2;
m is 0, 1, or 2
n+m is not greater than 4; and
any two adjacent R groups may be joined to form a substituted hydrocarbyl, unsubstituted hydrocarbyl, substituted heterocyclic ring, or unsubstituted heterocyclic ring, where the ring has 5, 6, 7, or 8 ring atoms and where substitutions on the ring can join to form additional rings;
any two X groups may be joined together to form a dianionic group;
any two L groups may be joined together to form a bidentate Lewis base; and
an X group may be joined to an L group to form a monoanionic bidentate group, and wherein the metal hydrocarbenyl chain transfer agent is represented by the formula:

Al(R')$_{3-v}$(R'')$_v$ wherein each R' independently is a $C_1$-$C_{30}$ hydrocarbenyl group; each R'', independently, is a $C_4$-$C_{20}$ hydrocarbenyl group having an end-allyl group; and v is from 0.1 to 3.
3. The process of paragraph 1 or 2, wherein the propylene polymer has (at 190° C.) one or more of:
a power law index of from about 0.38 to about 0.63;
transition index of from about 0.24 to about 0.52;
consistency (characteristic time) of from about 7 s to about 1.5 s;
infinite-rate viscosity of from about −181.8 to about −143 Pa·s; and
zero-shear viscosity of from about 117 kPa·s to about 3.9 kPa·s.
4. The process of any of paragraphs 1-3, wherein the propylene polymer has a $g'_{vis}$ of 0.95 or less, preferably 0.90 or less.
5. The process of any of paragraphs 1-4, wherein the propylene polymer has a Tc of 63° C. or more.
6. The process of any of paragraphs 1-5, wherein the propylene polymer has a shear thinning index at 190° C. of from 1 to 11.
7. The process of any of paragraphs 1-6, wherein the propylene polymer has a shear thinning index at 190° C. of from 4 to 7.
8. The process of any of paragraphs 1-7, wherein the propylene polymer has a terminal unsaturation of 80% or more, based upon the number of the total unsaturations.
9. The process of any of paragraphs 1-8, wherein the polymerization is performed in one or more continuous stirred tank reactors in series or in parallel.
10. The process of paragraph 9, wherein conversion of monomers is 20% or more.
11. The process of any of paragraphs 1 to 10, wherein the polymerization is performed at a temperature of from 70° C. to 150° C.
12. The process of paragraph 11, wherein the polymerization is performed at a temperature of from 80° C. to 120° C.
13. The process of paragraph 12, wherein the polymerization is performed at a temperature of from 90° C. to 100° C.
14. The process of any of paragraphs 1 to 13, wherein the catalyst compound has an efficiency greater than 50,000 g Polymer/g catalyst.
15. The process of any of paragraphs 2 to 14, wherein M is Ti, Zr, or Hf.
16. The process of any of paragraphs 2 to 15, wherein J is selected from:

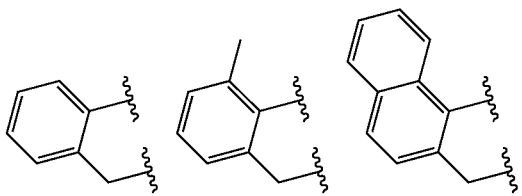

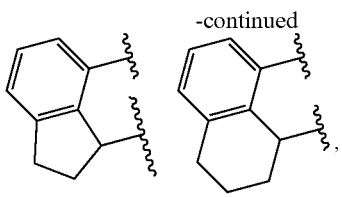

wherein ⁀ indicates connection to the catalyst compound.

17. The process of paragraph 2, wherein J is dihydro-1H-indenyl and $R^1$ is 2,6-dialkylphenyl or 2,4,6-trialkylphenyl.

18. The process of paragraph 2, wherein the catalyst compound is represented by Formula (II):

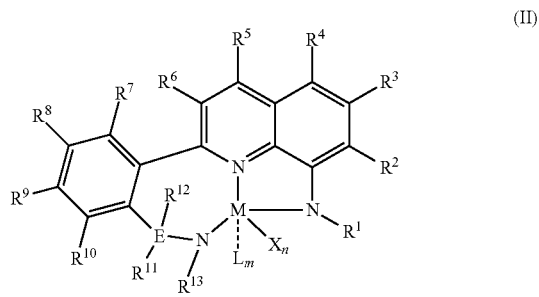

(II)

wherein M, L, X, m, n, $R^1$, $R^2$, $R^3$, $R^4$, $R^5$, $R^6$, and $R^{13}$ are as defined in paragraph 1, and E is carbon, silicon, or germanium;

$R^7$, $R^8$, $R^9$, $R^{10}$, $R^{11}$, and $R^{12}$ are independently selected from hydrogen, hydrocarbyls, alkoxy, silyl, amino, aryloxy, substituted hydrocarbyls, halogen, or any two adjacent R groups are joined to form a substituted or unsubstituted hydrocarbyl or heterocyclic ring, wherein the ring has 5, 6, 7, or 8 ring atoms and wherein substitutions on the ring can join to form additional rings.

19. The process of paragraph 18, wherein $R^{11}$ and $R^{12}$ are independently selected from hydrogen, methyl, ethyl, phenyl, isopropyl, isobutyl, and trimethylsilyl.

20. The process of paragraph 18 or 19, wherein E is carbon.

21. The process of paragraph 18, wherein $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, and trimethylsilyl.

22. The process of paragraph 18, wherein $R^2$, $R^3$, $R^4$, $R^5$, and $R^6$ are independently selected from hydrogen, hydrocarbyls, alkoxy, silyl, amino, substituted hydrocarbyls, and halogen.

23. The process of paragraph 18, wherein each L is independently selected from $Et_2O$, MeOtBu, $Et_3N$, $PhNMe_2$, $MePh_2N$, tetrahydrofuran, and dimethylsulfide and each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

24. The process of paragraph 18, wherein $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl; and/or $R^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

25. The process of paragraph 18, wherein $R^1$ is 2,6-diisopropylphenyl and $R^{13}$ is a hydrocarbyl group containing 1, 2, 3, 4, 5, 6, or 7 carbon atoms.

26. The process of paragraph 18, wherein the activator comprises an alumoxane and or a non-coordinating anion.

27. The process of paragraph 26, wherein the activator comprises one or more of: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, trimethylammonium tetrakis(perfluorophenyl)borate, 1-(4-(tris(pentafluorophenyl)borate)-2,3,5,6-tetrafluorophenyl)pyrrolidinium, dimethylanilinium tetrakis(pentafluorophenyl)borate, 4-(tris(pentafluorophenyl)borate)-2,3,5,6-tetrafluoropyridine, triphenylcarbenium tetraphenylborate, and triphenylcarbenium tetrakis-(2,3,4,6-tetrafluorophenyl)borate, methyldioctadecylammonium tetrakis(pentafluorophenyl)borate, methyldidodecylammonium tetrakis(pentafluorophenyl)borate, trihexadecylammonium tetrakis(pentafluorophenyl)borate.

28. The process of any of paragraphs 1 to 27, wherein the metal hydrocarbenyl transfer agent is represented by the formula:

$$Al(R')_{3-v}(R'')_v$$

wherein each R', independently, is a $C_1$-$C_{30}$ hydrocarbyl group;

each R'', independently, is a $C_4$-$C_{20}$ hydrocarbyl group having an allyl chain end; and v is from 0.01 to 3.

29. The process of paragraph 28, wherein R'' is butenyl, pentenyl, hexenyl, heptenyl, octenyl, decenyl, or dodecenyl, and/or R' is methyl, ethyl, propyl, isobutyl, or butyl.

30. The process of paragraph 28, wherein the metal hydrocarbenyl transfer agent comprises one or more of tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, tri(dodec-11-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, dimethyl(dec-9-en-1-yl)aluminum, diethyl(dec-9-en-1-yl)aluminum, dibutyl(dec-9-en-1-yl)aluminum, diisobutyl(dec-9-en-1-yl)aluminum, and diisobutyl(dodec-11-en-1-yl)aluminum, methyl-di(oct-7-en-1-yl)aluminum, ethyl-di(oct-7-en-1-yl)aluminum, butyl-di(oct-7-en-1-yl)aluminum, isobutyl-di(oct-7-en-1-yl)aluminum, isobutyl-di(non-8-en-1-yl)aluminum, methyl-di(dec-9-en-1-yl)aluminum, ethyl-di(dec-9-en-1-yl)aluminum, butyl-di(dec-9-en-1-yl)aluminum, isobutyl-di(dec-9-en-1-yl)aluminum, and isobutyl-di(dodec-11-en-1-yl)aluminum.

31. A branched propylene polymer comprising propylene and a remnant of a metal hydrocarbenyl chain transfer agent wherein the metal hydrocarbenyl chain transfer agent is represented by formula:

$Al(R')_{3-v}(R'')_v$ wherein each R', independently, is a $C_1$-$C_{30}$ hydrocarbyl group; each R'', independently, is a $C_4$-$C_{20}$ hydrocarbenyl group having an end-vinyl group; and v is from 0.1 to 3; wherein said branched propylene polymer comprising 90 wt % or more propylene, wherein said branched propylene polymer: a) has a $g'_{vis}$ of 0.97 or less; b) has strain hardening ratio of 1 or greater; c) has an Mw of 50,000 g/mol or more; and d) has a Mw/Mn of 4 or less.

32. The polymer of paragraph 31, wherein the branched propylene polymer has 5 wt % or less of xylene insoluble material.

33. The polymer of paragraph 31 wherein the propylene polymer has (at 190° C.) one or more of:
a power law index of from about 0.38 to about 0.63;
transition index of from about 0.24 to about 0.52;
consistency (characteristic time) of from about 7 s to about 1.5 s;
infinite-rate viscosity of from about −181.8 to about −143 Pa·s; and
zero-shear viscosity of from about 117 kPa·s to about 3.9 kPa·s.

34. The polymer of paragraph 31, wherein said branched propylene polymer has a $g'_{vis}$ of less than 0.95.

35. The polymer of paragraph 31, wherein the branched propylene polymer has a $g'_{vis}$ of 0.90 or less.

36. The polymer of paragraph 31, wherein the branched propylene polymer has a shear thinning index at 190° C. of from 1 to 11.

37. The polymer of paragraph 31, wherein the branched propylene polymer has a shear thinning index at 190° C. of from 4 to 7.

38. The polymer of paragraph 31, wherein the branched propylene polymer comprises 95 wt % or more propylene.

39. The polymer of paragraph 31, wherein the branched propylene polymer comprises 100 wt % propylene, not including the remnant of any metal hydrocarbenyl chain transfer agent.

40. The polymer of paragraph 31, wherein the branched propylene polymer has a terminal unsaturation of 80% or more, based upon the total unsaturations.

All molecular weights are weight average unless otherwise noted. All molecular weights are reported in g/mol unless otherwise noted. For purposes of the claims, Mw/Mn is Mw(LS)/Mn(DRI).

Synthesis of AVTA

Preparation of isobutyldi(dec-9-en-1-yl)aluminum (AVTA-2/10). 1,9-Decadiene (500 mL, 2.71 mol) was loaded into a round bottomed flask. Diisobutylaluminum hydride (30.2 mL, 0.170 mol) was added dropwise over 15 minutes. The mixture was then placed in a metal block maintained at 110° C. After 30 minutes the solution had stabilized at a temperature of 104° C. The mixture was kept at this temperature for an additional 135 minutes at which time $^1$H-NMR spectroscopic data indicated that the reaction had progressed to the desired amount. The reaction mixture was cooled to ambient temperature. The excess 1,9-decadiene was removed by vacuum distillation at 44° C./120 mTorr over a 2.5 hours. The product was further distilled at 50° C./120 mTorr for an additional hour to ensure complete removal of all 1,9-decadiene. The isolated product was a clear colorless oil. HNMR spectroscopic data suggests an average formulation of $Al(i-Bu)_{0.9}(decenyl)_{2.1}$ with an additional ca. 0.2 molar equivalent of what is presumed to be the triene formed by the insertion of 1,9-decadiene into an Al-decenyl bond followed by beta hydride elimination. Yield: 70.9 g.

Synthesis of Catalyst Complex QDA-1-Hf-Mea

Suitable transition metal catalysts of the present disclosure can have high rates of olefin propagation and negligible or no chain termination via beta hydride elimination, beta methyl elimination, or chain transfer to monomer relative to the rate of chain transfer to the AVTA or other chain transfer agent (CTA) such as an aluminum alkyl if present. Pyridyldiamido and quinolinyldiamido pre-catalysts activated with non-coordinating activators such as dimethylanilinium tetrakis(perfluorophenyl)borate and/or dimethylanilinium tetrakis(perfluoronaphthyl)borate are suitable catalysts for the present disclosure. Suitable catalyst compounds included (QDA-1)HfMe2 (see synthesis description and polymerization results below). The quinolinyldiamine ligand 2-(8-anilino-5,6,7,8-tetrahydronaphthalen-1-yl)-N-(2,6-diisopropylphenyl)quinolin-8-amine was prepared as described in US Patent Publication No. 2018/0002352 A1.

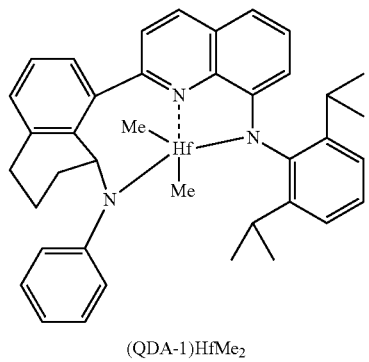

(QDA-1)HfMe$_2$

Preparation of (QDA-1)HfMe$_2$. Toluene (80 mL) was added to 2-(8-anilino-5,6,7,8-tetrahydronaphthalen-1-yl)-N-(2,6-diisopropylphenyl)quinolin-8-amine (QDA-1 diamine, 5.500 g, 10.46 mmol) and Hf(NMe$_2$)$_4$ (3.865 g, 10.89 mmol) to form a clear orange solution after stirring for a few minutes. The mixture was placed on a metal block that was then warmed to 85° C. After 21 hours the solution was clear and red tinted. The flask was allowed to cool to near ambient temperature and AlMe$_3$ (5.279 g, 73.23 mmol) was added quickly. The mixture became a darker red. After 7 hours the volatiles were removed overnight by evaporation with a stream of nitrogen. The resulting orange solid was crushed with a spatula and toluene (5 mL) was added to form a slurry. The slurry was stirred for 30 minutes then pentane (60 mL) was added. The suspension was stirred for 3 hours. The solid was then collected on a frit and washed with cold pentane (2×30 mL) to afford the product as an orange solid. H-NMR spectroscopic data indicated product (QDA-1) HfMe$_2$ of acceptable purity. Yield: 6.93 g, 90.5%.

Polymerization Examples

Polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. All flow rates of liquid were controlled using Coriolis mass flow controller (Quantim series from Brooks). Hydrogen (H$_2$) flowed as a gas under its own pressure through a Brooks flow controller. Propylene and hydrogen feeds were combined into one stream and then mixed with a pre-chilled isohexane stream that had been cooled to at least 0° C. The mixture was then fed to the reactor through a single line. The organoaluminum solution (TNOA and/or AVTA) was also added to the combined solvent and monomer stream just before it entered the reactor to further reduce any catalyst poisons. Similarly, catalyst solution was fed to the reactor using an ISCO syringe pump through a separated line.

Isohexane (used as solvent), and propylene were purified over beds of alumina and molecular sieves. Toluene for preparing catalyst solutions was purified by the same technique. An isohexane solution of tri-n-octyl aluminum (TNOA) (25 wt % in hexane, Sigma Aldrich) was used as scavenger solution. AVTA was diluted in toluene. The pre-catalyst complex (QDA-1)HfMe$_2$ was activated with N,N-dimethyl anilinium tetrakis (pentafluorophenyl) borate at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The detailed polymerization process conditions and some characteristic properties are listed in Table 1. PP-1 was a comparative example made using TNOA scavenger and hydrogen chain-terminating agent (and without AVTA). For this sample, the scavenger feed rate was adjusted to optimize the catalyst efficiency, with the feed rate varied from 0 (no TNOA) to 15 µmol Al/min No TNOA was used in the production of samples PP-2 through PP-4. The catalyst feed rates may also be adjusted according to the level of impurities in the system to reach the targeted conversions listed. All the reactions were carried out at a pressure of about 2.4 MPa/g unless otherwise mentioned. Additional processing conditions for the polymerization process of PP1-PP4, and the properties of the polymers produced are included below in Table 1.

TABLE 1

Polymerization details and data.

| | PP-1 | PP-2 | PP-3 | PP-4 |
|---|---|---|---|---|
| Polymerization temperature (° C.) | 95 | 95 | 95 | 95 |
| Catalyst feed rate (mol Hf/min) | 1.366E−07 | 1.366E−07 | 1.821E−07 | 1.821E−07 |
| Al Additive | TNOA 25 wt % | AVTA-2/10 | AVTA-2/10 | AVTA-2/10 |
| Al feed rate (mol Al/min) | 7.428E−06 | 7.722E−05 | 1.544E−04 | 1.158E−04 |
| Propylene feed rate (g/min) | 30 | 30 | 30 | 30 |
| Hydrogen (scc/min) | 10 | 0 | 0 | 0 |
| Isohexane feed rate (g/min) | 56.7 | 54 | 54 | 54 |
| Polymer made (g) | 473.5 | 161.2 | 378.4 | 367.6 |
| Conversion (wt % of monomers) | 39.5 | 26.9 | 31.5 | 30.6 |
| Catalyst efficiency (g polymer/g catalyst) | 118,375 | 80,600 | 70,950 | 68,925 |
| MFR (g/10 min) | 4.0 | 3.2 | 60.5 | 20.2 |
| Mn_DRI (g/mol) | 188,870 | 125,872 | 61,290 | 83,732 |
| Mw_DRI (g/mol) | 379,397 | 303,077 | 145,548 | 188,374 |
| Mz_DRI (g/mol) | 619,362 | 547,121 | 278,441 | 339,584 |
| Mn_LS (g/mol) | 204,746 | 142,330 | 67,557 | 89,931 |
| Mw_LS (g/mol) | 355,381 | 295,174 | 135,349 | 182,180 |
| Mz_LS (g/mol) | 521,081 | 509,582 | 228,369 | 320,255 |
| Mw (LS)/Mn (DRI) | 1.88 | 2.35 | 2.21 | 2.18 |
| g'$_{vis}$ | 1.06 | 0.99 | 0.95 | 0.95 |
| Tc (° C.) | 62.1 | 66.5 | 67.2 | 69.5 |
| Tm (° C.) | 110.6 | 110.6 | 111.6 | 111.4 |
| Tg (° C.) | −7.5 | −8.2 | −6.0 | −6.2 |
| Heat of fusion (J/g) | 41.4 | 41.5 | 37.2 | 42.8 |

Differential Scanning Calorimetry (DSC)

Peak melting point, $T_m$, (also referred to as melting point), peak crystallization temperature, $T_c$, (also referred to as crystallization temperature), glass transition temperature ($T_g$), heat of fusion ($\Delta H_f$ or $H_f$), and percent crystallinity are determined using the following DSC procedure according to ASTM D3418-03. Differential scanning calorimetric (DSC) data can be obtained using a TA Instruments model Q200 machine. Samples weighing approximately 5-10 mg are sealed in an aluminum hermetic sample pan. The DSC data are recorded by first gradually heating the sample to 200° C. at a rate of 10° C./minute. The sample is kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided; however, a value of 207 J/g is used for the heat of fusion for 100% crystalline polypropylene. The crystallization temperatures reported here were obtained during the second heating/cooling cycle unless otherwise noted.

MFR

The "melt flow rate" (MFR) is measured in accordance with ASTM D 1238 at 230° C. and 2.16 kg load. The "high load melt flow rate" (HLMFR) is measured in accordance with ASTM D1238 at 230° C. and 21.6 kg load.

Rheology

Complex viscosity is determined as described in the Experimental section of U.S. Pat. No. 9,458,310. Also see M. Van Gurp, J. Palmen, Rheol. Bull., 1998, 67, 5-8. The dependence of complex viscosity as a function of frequency can also be determined from rheological measurements at 190° C. The following ratio:

$$[\eta^*(0.1 \text{ rad/s}) - \eta^*(100 \text{ rad/s})]/\eta^*(0.1 \text{ rad/s})$$

was used to measure the degree of shear thinning of the polymeric materials of the embodiments herein, where $\eta^*(0.1 \text{ rad/s})$ and $\eta^*(100 \text{ rad/s})$ are the complex viscosities at frequencies of 0.1 and 100 rads, respectively, measured at 190° C. The higher this ratio, the higher is the degree of shear thinning.

The transient extensional viscosity was measured using a SER2P Testing Platform available from Xpansion Instruments LLC, Tallmadge, Ohio, USA. The SER Testing Platform was used on a MCR501 rheometer available from Anton Paar. The SER Testing Platform is described in U.S. Pat. Nos. 6,578,413 and 6,691,569, which are incorporated herein for reference. A general description of transient uniaxial extensional viscosity measurements is provided, for example, in "Measuring the transient extensional rheology of polyethylene melts using the SER universal testing platform", The Society of Rheology, Inc., J. Rheol. 49(3), 585-606 (2005), incorporated herein for reference. Strain hardening occurs when a polymer is subjected to elongational flow and the transient extensional viscosity increases with respect to the linear viscoelasticity envelop (LVE). Strain hardening is observed as abrupt upswing of the extensional viscosity in the transient extensional viscosity vs. time plot. A strain hardening ratio (SHR) is used to characterize the upswing in extensional viscosity and is defined as the ratio of the maximum transient extensional viscosity at certain strain rate over the respective value of the LVE. Strain hardening is present in the material when the ratio is greater than 1.

For the polymerization results collected in the Table 1, the "PP-1" through "PP-4" labels represent the four propylene polymer samples that were produced, T(° C.) is the polymerization temperature which was maintained within +/−1° C. "Yield" is mass of polymer sample isolated after solvent evaporation and is not corrected for aluminum or catalyst residue mass. Efficiency is reported at grams of polymer per gram of the Hf-based pre-catalyst complex, not taking into account the mass of the activator used.

As shown in Table 1, the samples produced using the AVTA reagents (PP-2 through PP-4) demonstrate more long-chain branching relative to the (comparative) sample (PP-1) prepared without AVTA reagent. This is shown by the reduced value of g'vis. Additionally, the AVTA produced samples (PP-2 through PP-4) have molecular weight distributions (Mw(LS)/Mn(DRI)) of 2.18 to 2.35, whereas the sample prepared without AVTA (PP-1) has a molecular weight distribution of 1.88. The AVTA produced samples (PP-2 to PP-4) also demonstrate crystallization temperatures (Tc) of 67-70° C., whereas the sample produced without AVTA (PP-1) had a $T_c$ of 62° C. The other values measured from the differential scanning calorimetry, including enthalpy of fusion, Tm, and Tg, show insignificant changes between the inventive and comparative samples. Additionally, polymer PP-3 was obtained with the highest MFR of 61 and with the lowest Mn value of 52,792 g/mol and the lowest Mw value of 134,819 g/mol. Without being bound by theory, the chosen catalyst system undergoes alkenyl group transfer with the AVTA, which enables the formation of polymer chains containing end-vinyl groups. Incorporation of these end-vinyl groups into growing polymer chains causes the formation of a long-chain branching in the polypropylene. The resulting polymer has been shown to have higher melt strength and shear thinning behavior relative to a linear comparative polymer.

Dynamic Shear Melt

Dynamic shear melt rheological data was measured with an Advanced Rheometrics Expansion System (ARES-G2) from TA Instruments using parallel plates (diameter=25 mm) in a dynamic mode under nitrogen atmosphere. For all experiments, the rheometer was thermally stable at 190° C. for at least 30 minutes before inserting compression-molded sample of resin onto the parallel plates. To determine the samples viscoelastic behavior, frequency sweeps in the range from 0.01 to 628 rad/s were carried out at a temperature of 190° C. under constant strain. Depending on the molecular weight and temperature, strains in the linear deformation range verified by strain sweep test were used. A nitrogen stream was circulated through the sample oven to minimize chain extension or cross-linking during the experiments. All the samples were compression molded at 190° C. A sinusoidal shear strain is applied to the material if the strain amplitude is sufficiently small the material behaves linearly. It can be shown that the resulting steady-state stress will also oscillate sinusoidally at the same frequency but will be shifted by a phase angle $\delta$ with respect to the strain wave. The stress leads the strain by $\delta$. For purely elastic materials $\delta=0°$ (stress is in phase with strain) and for purely viscous materials, $\delta=90°$ (stress leads the strain by 90° although the stress is in phase with the strain rate). For viscoelastic materials, $0<\delta<90$. The shear thinning slope (STS) was measured using plots of the logarithm (base ten) of the complex viscosity versus logarithm (base ten) of the angular frequency. The slope is the difference in the log(complex viscosity) at a frequency of 100 s-1 and the log(complex viscosity) at a frequency of 0.01 s-1 divided by 4.

FIG. 1 is a graph illustrating extensional viscosity of linear and branched homopolypropylenes. PP-2 and PP-4 deviate from linear behavior, indicative of long-chain branching. Without being bound by theory, the extent of long-chain branching suggests that typical chain termination mechanisms, such as chain transfer to monomer or beta-hydride elimination to metal, do not readily occur in polymerization conditions used for the AVTA produced samples (PP-2 to PP-4). Additionally, it indicates that the allyl groups of the AVTA are being incorporated into growing polymer chains to form long-chain branches. These other termination mechanisms would be expected to form linear polymer, such as conventional homopolypropylenes. However, this was not observed with the AVTA polymerizations performed. This observation may be due to the polymerization temperature of around 95° C., which could maintain a living polymerization. The level of long-chain branching is expected to be affected by the overall monomer conversion. The AVTA examples with long-chain branching were produced with conversions of 27 to 32%. It is expected that higher levels of branching would occur in equivalent AVTA polymerizations run at higher conversions.

Overall, polypropylene polymers containing long chain branching have been obtained by polymerization of propylene using a quinolinyldiamide catalyst in the presence of aluminum vinyl transfer agent (AVTA). Catalysts of the present disclosure can provide catalyst efficiency greater than 50,000 gP/gCat and polyolefins, such as propylene polymers, having from about 90 wt % or greater propylene, a $g'_{vis}$ average value of 0.97 or less, an Mn of 10,000 g/mol or greater, an Mw of 50,000 g/mol or greater, and an Mw/Mn of 4 or less.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A process to produce branched propylene polymers comprising:
   1) contacting, at a temperature of from 70° C. to 150° C., monomer comprising propylene with a catalyst system comprising: a) an activator, b) a metal hydrocarbenyl chain transfer agent represented by the formula:

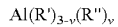

wherein each R', independently, is a $C_1$-$C_{30}$ hydrocarbyl group; each R", independently, is a $C_4$-$C_{20}$ hydrocarbenyl group having an allyl chain end; and v is from 0.01 to 3, and c) non-metallocene olefin polymerization transition metal complex that readily undergoes reversible polymeryl group chain transfer with the metal hydrocarbenyl chain transfer agent and is also capable of incorporating the allyl chain end of the metal hydrocarbenyl chain transfer agent to form a long-chain branched polymer,
   wherein the non-metallocene polymerization catalyst transition metal complex undergoes reversible polymeryl group chain transfer with the metal hydrocarbenyl transfer agent and incorporates the allyl chain end of the metal hydrocarbenyl transfer agent to form a long-chain branched polymer; and
   2) obtaining a branched propylene polymer comprising from about 90 wt % or greater propylene, wherein said branched propylene polymer: a) has a $g'_{vis}$ of 0.97 or less;
   b) has strain hardening ratio of 1 or greater; c) has an Mw of 50,000 g/mol or more; and d) has a Mw/Mn of 4 or less.

2. A process to produce branched propylene polymers comprising:
   1) contacting monomer comprising propylene with a catalyst system comprising an activator, a metal hydrocarbenyl chain transfer agent, and a non-metallocene complex represented by Formula (I):

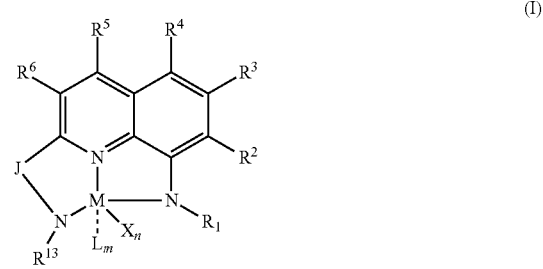

wherein:
   M is a group 3, 4, or 5 metal;
   J is a three-atom-length bridge between the quinoline and the amido nitrogen;
   X is an anionic leaving group;
   L is a neutral Lewis base;
   $R^1$ and $R^{13}$ are independently selected from the group consisting of hydrocarbyls, substituted hydrocarbyls, and silyl groups;
   $R^2$, $R^3$, $R^4$, $R^5$, and $R^6$ are independently selected from the group consisting of hydrogen, hydrocarbyls, alkoxy, silyl, amino, aryloxy, substituted hydrocarbyls, halogen, and phosphino;
   n is 1 or 2;
   m is 0, 1, or 2
   n+m is not greater than 4; and
   any two adjacent R groups may be joined to form a substituted hydrocarbyl, unsubstituted hydrocarbyl, substituted heterocyclic ring, or unsubstituted heterocyclic ring, where the ring has 5, 6, 7, or 8 ring atoms and where substitutions on the ring can join to form additional rings;
   any two X groups may be joined together to form a dianionic group;
   any two L groups may be joined together to form a bidentate Lewis base; and
   an X group may be joined to an L group to form a monoanionic bidentate group, and
   wherein the metal hydrocarbenyl chain transfer agent is represented by the formula:

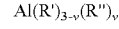

wherein each R' independently is a $C_1$-$C_{30}$ hydrocarbyl group; each R", independently, is a $C_4$-$C_{20}$ hydrocarbenyl group having an allyl chain end; and v is from 0.1 to 3;

2) obtaining a branched propylene polymer comprising from about 90 wt % or greater propylene, wherein said branched propylene polymer: a) has a g'$_{vis}$ of 0.97 or less;

b) has strain hardening ratio of 1 or greater; c) has an Mw of 50,000 g/mol or more; and d) has a Mw/Mn of 4 or less.

3. The process of claim 1, wherein the propylene polymer has (at 190° C.) one or more of:
a power law index of from about 0.38 to about 0.63;
transition index of from about 0.24 to about 0.52;
consistency (characteristic time) of from about 7s to about 1.5s;
infinite-rate viscosity of from about −181.8 to about −143 Pa·s; and
zero-shear viscosity of from about 117 kPa·s to about 3.9 kPa·s.

4. The process of claim 1, wherein the propylene polymer has a g'$_{vis}$ of 0.95 or less.

5. The process of claim 1, wherein the propylene polymer has a Tc of 63° C. or more.

6. The process of claim 1, wherein the propylene polymer has a shear thinning index at 190° C. of from 1 to 11.

7. The process of claim 2, wherein the propylene polymer has a shear thinning index at 190° C. of from 4 to 7.

8. The process of claim 1, wherein the propylene polymer has a terminal unsaturation of 80% or more, based upon the number of the total unsaturations.

9. The process of claim 1, wherein the polymerization is performed in one or more continuous stirred tank reactors in series or in parallel.

10. The process of claim 9, wherein conversion of monomers is 20% or more.

11. The process of claim 1, wherein the polymerization is performed at a temperature of from 75° C. to 150° C.

12. The process of claim 2, wherein the polymerization is performed at a temperature of from 80° C. to 120° C.

13. The process of claim 3, wherein the polymerization is performed at a temperature of from 90° C. to 100° C.

14. The process of claim 1, wherein the catalyst compound has an efficiency greater than 50,000 g Polymer/g catalyst.

15. The process of claim 2, wherein M is Ti, Zr, or Hf.

16. The process of claim 2, wherein J is selected from:

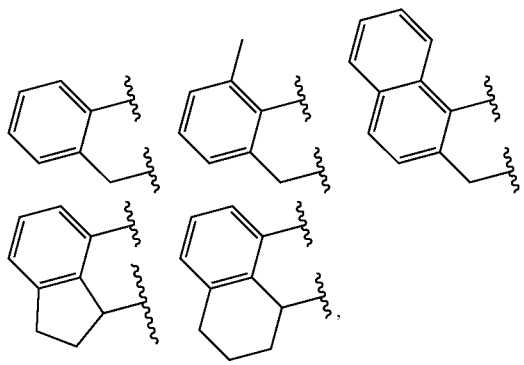

wherein ⁎ indicates connection to the catalyst compound.

17. The process of claim 2, wherein J is dihydro-1H-indenyl and $R^1$ is 2,6-dialkylphenyl or 2,4,6-trialkylphenyl.

18. The process of claim 2, wherein the catalyst compound is represented by Formula (II):

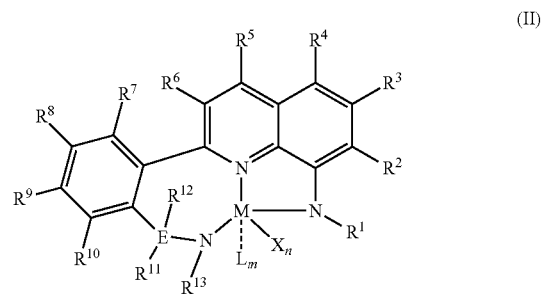

wherein M, L, X, m, n, $R^1$, $R^2$, $R^3$, $R^4$, $R^5$, $R^6$, and $R^{13}$ are as defined in claim 2, and
E is carbon, silicon, or germanium;
$R^7$, $R^8$, $R^9$, $R^{10}$, $R^{11}$ and $R^{12}$ are independently selected from hydrogen, hydrocarbyls, alkoxy, silyl, amino, aryloxy, substituted hydrocarbyls, halogen, or any two adjacent R groups are joined to form a substituted or unsubstituted hydrocarbyl or heterocyclic ring, wherein the ring has 5, 6, 7, or 8 ring atoms and wherein substitutions on the ring can join to form additional rings.

19. The process of claim 18, wherein $R^{11}$ and $R^{12}$ are independently selected from hydrogen, methyl, ethyl, phenyl, isopropyl, isobutyl, and trimethylsilyl.

20. The process of claim 18, wherein E is carbon.

21. The process of claim 18, wherein $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, and trimethylsilyl.

22. The process of claim 18, wherein $R^2$, $R^3$, $R^4$, $R^5$, and $R^6$ are independently selected from hydrogen, hydrocarbyls, alkoxy, silyl, amino, substituted hydrocarbyls, and halogen.

23. The process of claim 18, wherein each L is independently selected from $Et_2O$, MeOtBu, $Et_3N$, $PhNMe_2$, $MePh_2N$, tetrahydrofuran, and dimethylsulfide and each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

24. The process of claim 18, wherein $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl; and/or R13 is phenyl, 2 methylphenyl, 2-ethylphenyl, 2-propylphenyl, 2,6-dimethylphenyl, 2-isopropylphenyl, 4 methylphenyl, 3,5-dimethylphenyl, 3,5-di-tert-butylphenyl, 4-fluorophenyl, 3 methylphenyl, 4-dimethylaminophenyl, or 2-phenylphenyl.

25. The process of claim 18, wherein $R^1$ is 2,6-diisopropylphenyl and $R^{13}$ is a hydrocarbyl group containing 1, 2, 3, 4, 5, 6, or 7 carbon atoms.

26. The process of claim 18, wherein the activator comprises an alumoxane and/or a non-coordinating anion.

27. The process of claim 26, wherein the activator comprises one or more of:
trimethylammonium tetrakis(perfluoronaphthyl)borate, N,N-dimethylanilinium tetrakis(perfluoronaphthyl)borate, N,N-diethylanilinium tetrakis(perfluoronaphthyl) borate, triphenylcarbenium tetrakis(perfluoronaphthyl) borate, trimethylammonium tetrakis (perfluorobiphenyl)borate, N,N-dimethylanilinium tetrakis(perfluorobiphenyl)borate, triphenylcarbenium tetrakis(perfluorobiphenyl)borate, N,N-dimethylanilinium tetrakis (3,5 bis(trifluoromethyl)phenyl)borate, triphenylcarbenium tetrakis(perfluoronaphthyl) borate, triphenylcarbenium tetrakis(perfluorobiphenyl) borate, triphenylcarbenium tetrakis (3,5-bis(trifluoromethyl)phenyl)borate, triphenylcarbenium tetrakis(perfluorophenyl)borate, trimethylammonium tetrakis(perfluorophenyl)borate, 1 (4 (tris(pentafluorophenyl)borate)-2,3,5,6-tetrafluorophenyl)pyrrolidinium, dimethylanilinium tetrakis(pentafluorophenyl)borate, 4 (tris(pentafluorophenyl)borate)-2,3,5,6-tetrafluoropyridine, triphenylcarbenium tetraphenylborate, and triphenylcarbenium tetrakis-(2, 3,4,6-tetrafluorophenyl)borate, methyldioctadecylammonium tetrakis(pentafluorophenyl)borate, methyldidodecylammonium tetrakis(pentafluorophenyl)borate, trihexadecylammonium tetrakis(pentafluorophenyl)borate.

28. The process of claim 1, wherein v is from 1.1 to 3.

29. The process of claim 28, wherein R" is butenyl, pentenyl, hexenyl, heptenyl, octenyl, decenyl, or dodecenyl, and/or R' is methyl, ethyl, propyl, isobutyl, or butyl.

30. The process of claim 28, wherein the metal hydrocarbenyl transfer agent comprises one or more of tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, tri(dodec-11-en-1-yl)aluminum, dimethyl(oct-7-en-1- yl)aluminum, diethyl(oct-7-en-1-yl) aluminum, dibutyl(oct-7-en-1-yl)aluminum, diisobutyl(oct-7-en-1-yl)aluminum, diisobutyl(non-8-en-1-yl)aluminum, dimethyl(dec-9-en-1-yl)aluminum, diethyl(dec-9-en-i-yl) aluminum, dibutyl(dec-9-en-1-yl)aluminum, diisobutyl (dec-9-en-1-yl)aluminum, and diisobutyl(dodec-11-en-1-yl) aluminum, methyl-di(oct-7-en-1-yl)aluminum, ethyl-di(oct-7-en-1-yl)aluminum, butyl-di(oct-7-en-1-yl)aluminum, isobutyl-di(oct-7-en-1-yl)aluminum, isobutyl-di(non-8-en-1-yl)aluminum, methyl-di(dec-9-en-1-yl)aluminum, ethyl-di(dec-9-en-1-yl)aluminum, butyl-di(dec-9-en-1-yl)aluminum, isobutyl-di(dec-9-en-1-yl)aluminum, and isobutyl-di (dodec-11-en-1-yl)aluminum.

31. The process of claim 1, wherein the branched propylene polymer has 5 wt % or less of xylene insoluble material.

32. The process of claim 1, wherein the branched propylene polymer comprises 95 wt % or more propylene.

33. The process of claim 1, wherein the branched propylene polymer comprises 100 wt % propylene, not including the remnant of any metal hydrocarbenyl chain transfer agent.

34. The process of claim 1, wherein the propylene polymer has a $g'_{vis}$ of 0.90 or less.

35. The process of claim 1, wherein the non-metallocene polymerization catalyst transition metal complex is a late transition metal pyridylbisimine complex.

36. The process of claim 1, wherein the non-metallocene polymerization catalyst transition metal complex is a pyridylamido complex.

37. The process of claim 1, wherein the non-metallocene polymerization catalyst transition metal complex is a phenoxyimine complex.

38. The process of claim 1, wherein the non-metallocene polymerization catalyst transition metal complex is a bridged bi-aromatic complex.

39. The process of claim 1, wherein the non-metallocene polymerization catalyst transition metal complex is selected from the group consisting of iron complexes of tridentate pyridylbisimine ligands, zirconium and hafnium complexes of pyridylamido ligands, zirconium and hafnium complexes of tridentate pyridyldiamido ligands, zirconium and hafnium complexes of tridentate quinolinyldiamido ligands, zirconium and hafnium complexes of bidentate phenoxyimine ligands, and zirconium and hafnium complexes of bridged bi-aromatic ligands.

40. The process of claim 1, wherein the non-metallocene polymerization catalyst transition metal complex is selected from the group consisting of group 4 non-metallocene complexes including: 1) two anionic donor atoms and one or two neutral donor atoms, or 2) an anionic amido donor, or 3) an anionic aryloxide donor atom, or 4) two anionic aryloxide donor atoms and two additional neutral donor atoms.

41. The process of claim 1, wherein the non-metallocene polymerization catalyst transition metal complex is a group 4 pyridyldiamido complex.

* * * * *